US012476097B2

(12) United States Patent
Cox et al.

(10) Patent No.: US 12,476,097 B2
(45) **Date of Patent: *Nov. 18, 2025**

(54) IDENTIFICATION OF A FIRST SAMPLE IN A SERIES OF SEQUENTIAL SAMPLES

(71) Applicant: DH TECHNOLOGIES DEVELOPMENT PTE. LTD., Singapore (SG)

(72) Inventors: David M. Cox, Toronto (CA); Chang Liu, Richmond Hill (CA); Stephen A. Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 354 days.

This patent is subject to a terminal disclaimer.

(21) Appl. No.: 17/999,635

(22) PCT Filed: May 21, 2021

(86) PCT No.: PCT/IB2021/054401

§ 371 (c)(1),
(2) Date: Nov. 22, 2022

(87) PCT Pub. No.: WO2021/234644

PCT Pub. Date: Nov. 25, 2021

(65) Prior Publication Data

US 2023/0238232 A1 Jul. 27, 2023

Related U.S. Application Data

(60) Provisional application No. 63/029,237, filed on May 22, 2020.

(51) Int. Cl.

| | |
|---|---|
| ***H01J 49/04*** | (2006.01) |
| ***H01J 49/00*** | (2006.01) |

(52) U.S. Cl.

CPC ...... *H01J 49/0454* (2013.01); *H01J 49/0009* (2013.01); *H01J 49/0027* (2013.01); *H01J 49/0404* (2013.01)

(58) Field of Classification Search

CPC ............. H01J 49/05454; H01J 49/0009; H01J 49/0027; H01J 49/0404

See application file for complete search history.

(56) References Cited

U.S. PATENT DOCUMENTS

| | | | |
|---|---|---|---|
| 7,923,681 | B2 | 4/2011 | Collings |
| 2004/0183007 | A1 | 9/2004 | Belov et al. |

(Continued)

FOREIGN PATENT DOCUMENTS

| | | |
|---|---|---|
| GB | 2530836 A | 4/2016 |

OTHER PUBLICATIONS

International Search Report and Written Opinion for PCT/IB2021/054401, mailed Sep. 27, 2021.

(Continued)

*Primary Examiner* — Nicole M Ippolito

(74) *Attorney, Agent, or Firm* — Merchant & Gould P.C.

(57) ABSTRACT

An ADE device identifies an identifiable sequence of one or more ejections from at least one sample using a different value or pattern of values for one or more ADE parameters. The identifiable one or more ejections are performed to produce one or more mass peaks that have a different feature value or pattern of feature values for one or more peak features than other mass peaks produced. Ejection times are stored. One or more detected peaks with the different feature values or pattern of feature values are identified as produced by the identifiable one or more ejections. A delay time is calculated from the time of the identifiable ejections and the (Continued)

time of the identified detected peaks and the peaks are aligned with samples using delay time, stored times, and order of the samples.

20 Claims, 15 Drawing Sheets

(56) References Cited

U.S. PATENT DOCUMENTS

| | | | | |
|---|---|---|---|---|
| 2010/0116982 | A1 | 5/2010 | Iwamoto et al. | |
| 2013/0168545 | A1 | 7/2013 | Clem et al. | |
| 2019/0157060 | A1 | 5/2019 | Datwani et al. | |
| 2023/0207298 | A1 * | 6/2023 | Liu | H01J 49/0454 250/281 |
| 2023/0207299 | A1 * | 6/2023 | Covey | H01J 49/0036 250/282 |

OTHER PUBLICATIONS

Liu et al. "Operational Modes and Speed Considerations of an Acoustic Droplet Dispenser for Mass Spectrometry," Analytical Chemistry, vol. 92, No. 24, Oct. 16, 2020, pp. 15818-15826.

Anonymous: "Voyager Biospectrometry Workstation with Delayed Extraction" Jan. 1, 2000, XP055286306, Retrieved from the Internet: http://www.niu.edu/analyticallab/_pdf/maldi/yoyager-v51-usersguide.pdf.

Hager, James et al., "Product ion scanning using a Q-q-Q linear ion trap (Q Trap) mass spectrometer", in Rapid Communications in Mass Spectrometer, 2003; 17: 1056-1064.

PCT International Preliminary Report on Patentability in Application PCT/IB2021/054401, mailed Dec. 1, 2022, 16 pages.

* cited by examiner

900

1300

IDENTIFICATION OF A FIRST SAMPLE IN A SERIES OF SEQUENTIAL SAMPLES

RELATED US APPLICATIONS

This application is a National Stage Application of PCT/IB2021/054401, filed May 21, 2021, which claims the benefit of U.S. Provisional Application No. 63/029,237, filed on May 22, 2020, the entire disclosures of which are incorporated herein by reference in their entireties. To the extent appropriate, a claim of priority is made to each of the above disclosed applications.

INTRODUCTION

The teachings herein relate to operating an acoustic droplet ejection (ADE) device coupled to a mass spectrometer by an open port interface (OPI), referred to as an acoustic ejection mass spectrometry (AEMS) system, and how to align ejected samples with detected mass peaks. More specifically, systems and methods are provided to identify a first sample in a sequence of one or more samples.

Sample Timing Problem

As described below, an ADE device can be used to deliver samples rapidly to an open port interface (OPI), which, in turn, transfers an analyte through a transfer tube to a mass spectrometer, where the analyte is analyzed. This method of sample analysis is referred to as AEMS. In AEMS, there is a delay from when the acoustic ejection occurs to when the signal from the analyte is detected (several seconds). There is also variability in how long it takes analytes to travel from the acoustic ejection to the entrance of the mass spectrometer.

When using an OPI in AEMS at high-speed ejection rates (1 sample every second), there may be multiple diluted sample plugs traveling within the transfer tube at the same time. When identifying which detected signal belongs to which sample, it is extremely important to identify the first sample in the sequence of sample injections. If the signal for the first sample is missing or misidentified, there is a risk that the signal from a subsequent sample is identified as the signal from the first sample, and then all the analyses of samples thereafter are incorrect.

Reasons for why the first sample may not be detected can include, but are not limited to, a user not adding analyte to a well, the ADE device misfiring or firing but the droplet not entering the OPI, e.g. due to static charge, asymmetrical sample surface meniscus or misalignment, or the sample well containing air bubbles that prevent the proper ejection of a droplet. Although the occurrence of missing a signal from a sample might be rare, the consequences of it happening are severe (incorrect data).

Currently, in AEMS systems, an ADE device produces a timing file that specifies the time each sample of each well is ejected. After mass spectrometry (MS) analysis, the peaks detected over time are aligned with the times of the timing file to identify samples. However, if some peaks, particularly the first one or more peaks, are missing, this alignment may be confounded.

As a result, additional AEMS systems and methods are needed to align the ejection times of the ADE device with the peaks detected over time by the mass spectrometer in order to ensure that missing peaks do not produce errors in the data collected.

ADE and OPI Background

Accurate determination of the presence, identity, concentration, and/or quantity of an analyte in a sample is critically important in many fields. Many techniques used in such analyses involve ionization of species in a fluid sample prior to introduction into the analytical equipment employed. The choice of ionization method will depend on the nature of the sample and the analytical technique used, and many ionization methods are available. Mass spectrometry is a well-established analytical technique in which sample molecules are ionized and the resulting ions are then sorted by mass-to-charge ratio.

The ability to couple mass spectrometric analysis, particularly electrospray mass spectrometric analysis, to separation techniques, such as liquid chromatography (LC), including high-performance liquid chromatography (HPLC), capillary electrophoresis, or capillary electrochromatography, has meant that complex mixtures can be separated and characterized in a single process. Improvements in HPLC system design, such as reductions in dead volumes and an increase in pumping pressure, have enabled the benefits of smaller columns containing smaller particles, improved separation, and faster run time to be realized. Despite these improvements, the time required for sample separation is still around one minute. Even if real separation is not required, the mechanics of loading samples into the mass spectrometer still limit sample loading time to about ten seconds per sample using conventional autosamplers with some level of cleanup between injections.

There has been some success in improving throughput performance. Simplifying sample processing by using solid-phase extraction, rather than traditional chromatography, to remove salts can reduce pre-injection times to under ten seconds per sample from the minutes per sample required for HPLC. However, the increase in sampling speed comes at the cost of sensitivity. Furthermore, the time saved by the increase in sampling speed is offset by the need for cleanup between samples.

Another limitation of current mass spectrometer loading processes is the problem of carryover between samples, which necessitates a cleaning step after each sample is loaded to avoid contamination of a subsequent sample with a residual amount of analyte in the prior sample. This requires time and adds a step to the process, complicating rather than streamlining the analysis with conventional autosampler systems.

Additional limitations of current mass spectrometers when used to process complex samples, such as biological fluids, are unwanted "matrix effects," phenomena that result from the presence of matrix components (e.g., natural matrix components such as cellular matrix components, or contaminants inherent in some materials such as plastics) and adversely affect detection capability, precision, and/or accuracy for the analyte of interest.

A system was developed combining ADE with an open port interface (OPI) for high-throughput mass spectrometry. This system is described in U.S. patent application Ser. No. 16/198,667 (hereinafter the "'667 Application"), which is incorporated herein in its entirety.

FIG. 1A is an exemplary system combining ADE with an OPI, as described in the '667 Application. In FIG. 1A, the ADE device is shown generally at 11, ejecting droplet 49 toward the continuous flow OPI indicated generally at 51 and into the sampling tip 53 thereof.

ADE device 11 includes at least one reservoir, with a first reservoir shown at 13 and an optional second reservoir 31.

In some embodiments, a further plurality of reservoirs may be provided. Each reservoir is configured to house a fluid sample having a fluid surface, e.g., a first fluid sample 14 and a second fluid sample 16 having fluid surfaces respectively indicated at 17 and 19. The fluid samples 14 and 16 may be the same or different, but are generally different, insofar as they will ordinarily contain two different analytes intended to be transported to and detected in an analytical instrument (not shown). The analyte may be a biomolecule or a macromolecule other than a biomolecule, or it may be a small organic molecule, an inorganic compound, an ionized atom, or any moiety of any size, shape, or molecular structure, as explained earlier in this section. In addition, the analyte may be dissolved, suspended or dispersed in the liquid component of the fluid sample.

When more than one reservoir is used, as illustrated in FIG. 1A, the reservoirs are preferably both substantially identical and substantially acoustically indistinguishable, although identical construction is not a requirement. As explained earlier in this section, the reservoirs may be separate removable components in a tray, rack, or other such structure, but they may also be fixed within a plate, e.g., a well plate, or another substrate. Each reservoir is preferably substantially axially symmetric, as shown, having vertical walls 21 and 23 extending upward from circular reservoir bases 25 and 27, and terminating at openings 29 and 31, respectively, although other reservoir shapes and reservoir base shapes may be used. The material and thickness of each reservoir base should be such that acoustic radiation may be transmitted therethrough and into the fluid sample contained within each reservoir.

ADE device 11 comprises acoustic ejector 33, which includes acoustic radiation generator 35 and focusing means 37 for focusing the acoustic radiation generated at a focal point 47 within the fluid sample, near the fluid surface. As shown in FIG. 1A, the focusing means 37 may comprise a single solid piece having a concave surface 39 for focusing the acoustic radiation, but the focusing means may be constructed in other ways as discussed below. The acoustic ejector 33 is thus adapted to generate and focus acoustic radiation so as to eject a droplet of fluid from each of the fluid surfaces 17 and 19 when acoustically coupled to reservoirs 13 and 15, and thus to fluids 14 and 16, respectively. The acoustic radiation generator 35 and the focusing means 37 may function as a single unit controlled by a single controller, or they may be independently controlled, depending on the desired performance of the device.

Optimally, acoustic coupling is achieved between the ejector and each of the reservoirs through indirect contact, as illustrated in FIG. 1A. In the figure, an acoustic coupling medium 41 is placed between the ejector 33 and the base 25 of reservoir 13, with the ejector and reservoir located at a predetermined distance from each other. The acoustic coupling medium may be an acoustic coupling fluid, preferably an acoustically homogeneous material in conformal contact with both the acoustic focusing means 37 and the underside of the reservoir. In addition, it is important to ensure that the fluid medium is substantially free of material having different acoustic properties than the fluid medium itself. As shown, the first reservoir 13 is acoustically coupled to the acoustic focusing means 37 such that an acoustic wave generated by the acoustic radiation generator is directed by the focusing means 37 into the acoustic coupling medium 41, which then transmits the acoustic radiation into the reservoir 13. The system may contain a single acoustic ejector, as illustrated in FIG. 1A, or, as noted previously, it may contain multiple ejectors.

In operation, reservoir 13, and optional reservoir 15 in embodiments where multiple reservoirs are provided, of the device are filled with first and second fluid samples 14 and 16, respectively, as shown in FIG. 1A. The acoustic ejector 33 is positioned just below reservoir 13, with acoustic coupling between the ejector and the reservoir provided by means of acoustic coupling medium 41. Initially, the acoustic ejector is positioned directly below sampling tip 53 of OPI 51, such that the sampling tip faces the surface 17 of the fluid sample 14 in the reservoir 13. Once the ejector 33 and reservoir 13 are in proper alignment below sampling tip 53, the acoustic radiation generator 35 is activated to produce acoustic radiation that is directed by the focusing means 37 to a focal point 47 near the fluid surface 17 of the first reservoir. As a result, droplet 49 is ejected from the fluid surface 17 toward and into the liquid boundary 50 at the sampling tip 53 of the OPI 51, where it combines with solvent in the flow probe 53.

The profile of the liquid boundary 50 at the sampling tip 53 may vary from extending beyond the sampling tip 53 to projecting inward into the OPI 51. In a multiple-reservoir system, the reservoir unit (not shown), e.g., a multi-well plate or tube rack, can then be repositioned relative to the acoustic ejector such that another reservoir is brought into alignment with the ejector and a droplet of the next fluid sample can be ejected. The solvent in the flow probe cycles through the probe continuously, minimizing or even eliminating “carryover” between droplet ejection events. A multi-well plate can include, but is not limited to, a 24 well, a 384 well, or a 1536 well plate.

Fluid samples 14 and 16 are samples of any fluid for which transfer to an analytical instrument is desired. Accordingly, the fluid sample may contain a solid that is minimally, partially or fully solvated, dispersed, or suspended in a liquid, which may be an aqueous liquid or a nonaqueous liquid. The structure of an embodiment of a OPI 51 is also shown in FIG. 1A. Other configurations of continuous flow OPIs can be used as is or in modified form, all of which, as is well known in the art, and operate according to substantially the same principles. As can be seen in FIG. 1A, the sampling tip 53 of OPI 51 is spaced apart from the fluid surface 17 in the reservoir 13, with a gap 55 therebetween. The gap 55 may be an air gap, or a gap of an inert gas, or it may comprise some other gaseous material; there is no liquid bridge connecting the sampling tip 53 to the fluid 14 in the reservoir 13.

The OPI 51 includes a solvent inlet 57 for receiving solvent from a solvent source and a solvent transport capillary 59 for transporting the solvent flow from the solvent inlet 57 to the sampling tip 53, where the ejected droplet 49 of analyte-containing fluid sample 14 combines with the solvent to form an analyte-solvent dilution. A solvent pump (not shown) is operably connected to and in fluid communication with solvent inlet 57 in order to control the rate of solvent flow from a solvent supply through the solvent transport capillary to the sampling tip 53, and thus the rate of solvent flow within the solvent transport capillary 59 as well.

Fluid flow within the OPI 51 carries the analyte-solvent dilution through a sample transport capillary 61 provided by inner capillary tube 73 toward sample outlet 63 for subsequent transfer to an analytical instrument. A sampling pump (not shown) can be provided that is operably connected to and in fluid communication with the sample transport capillary 61, to control the output rate from outlet 63 as well as the aspiration of solvent at the sampling tip 53.

In one embodiment, a positive displacement pump is used as the solvent pump, e.g., a peristaltic pump, and, instead of a sampling pump, an aspirating nebulization system is used so that the analyte-solvent dilution is drawn out of the sample outlet 63 by the Venturi effect caused by the flow of the nebulizing gas introduced from a nebulizing gas source 65 via gas inlet 67 (shown in simplified form in FIG. 1A, insofar as the features of aspirating nebulizers are well known in the art) as it flows over the outside of the sample outlet 63. The analyte-solvent dilution flow is then drawn upward through the sample transport capillary 61 by the pressure drop generated as the nebulizing gas passes over the sample outlet 63 and combines with the fluid exiting the sample transport capillary 61. A gas pressure regulator is used to control the rate of gas flow into the system via gas inlet 67.

In a preferred manner, the nebulizing gas flows over the outside of the sample transport capillary 61 at or near the sample outlet 63 in a sheath flow type manner which draws the analyte-solvent dilution through the sample transport capillary 61 as it flows across the sample outlet 63 that causes aspiration at the sample outlet upon mixing with the nebulizer gas. In various embodiments, sample outlet 63 is a straight pipe protruding out of a gas nozzle.

In the illustrated embodiment, the solvent transport capillary 59 and sample transport capillary 61 are provided by outer capillary tube 71 and inner capillary tube 73 substantially co-axially disposed therein, where the inner capillary tube 73 defines the sample transport capillary, and the annular space between the inner capillary tube 73 and outer capillary tube 71 defines the solvent transport capillary 59. The dimensions of the inner capillary tube 73 can be from 1 micron to 1 mm, e.g., 200 microns. Typical dimensions of the outer diameter of the inner capillary tube 73 can be from 100 microns to 3 or 4 centimeters, e.g., 360 microns. Typical dimensions of the inner diameter of the outer capillary tube 71 can be from 100 microns to 3 or 4 centimeters, e.g., 450 microns. Typical dimensions of an outer diameter of the outer capillary tube 71 can be from 150 microns to 3 or 4 centimeters, e.g., 950 microns.

In other embodiments, different geometries and configurations of solvent transport capillaries and sample transport capillaries may be provided. For instance, the capillaries need not be co-axial and may have different cross-sections from those illustrated, provided they are suitable to supply solvent to an exposed sampling region and aspirate the supplied solvent and captured sample from the sampling region for analysis by a sample analyzer. The cross-sectional areas of the inner capillary tube 73 and/or the outer capillary tube 71 can be circular, elliptical, superelliptical (i.e., shaped like a superellipse), or even polygonal. While the illustrated system in FIG. 1A indicates the direction of solvent flow as downward from the solvent inlet 57 toward sampling tip 53 in the solvent transport capillary 59 and the direction of the analyte-solvent dilution flow as upward from the sampling tip 53 upward through the sample transport capillary 61 toward outlet 63, the directions can be reversed, and the OPI 51 is not necessarily positioned to be exactly vertical. Various modifications to the structure shown in FIG. 1A will be apparent to those of ordinary skill in the art, or may be deduced by those of ordinary skill in the art during use of the system.

The system can also include an adjuster 75 coupled to the outer capillary tube 71 and the inner capillary tube 73. The adjuster 75 can be adapted for moving the outer capillary tube tip 77 and the inner capillary tube tip 79 longitudinally relative to one another. The adjuster 75 can be any device capable of moving the outer capillary tube 71 relative to the inner capillary tube 73. Exemplary adjusters 75 can be motors including, but not limited to, electric motors (e.g., AC motors, DC motors, electrostatic motors, servo motors, etc.), hydraulic motors, pneumatic motors, translational stages, and combinations thereof. As used herein, "longitudinally" refers to an axis that runs the length of the OPI 51, and the inner and outer capillary tubes 73, 71 can be arranged coaxially around a longitudinal axis of the OPI 51, as shown in FIG. 1.

Optionally, prior to use, the adjuster 75 is used to draw the inner capillary tube 73 longitudinally inward so that the outer capillary tube 71 protrudes beyond the end of the inner capillary tube 73, so as to facilitate optimal fluid communication between the solvent flow in the solvent transport capillary 59 and the sample transported as an analyte-solvent dilution flow 61 in the sample transport capillary 61. Additionally, as illustrated in FIG. 1A, the OPI 51 is generally affixed within an approximately cylindrical holder 81, for stability and ease of handling.

FIG. 1B is an exemplary embodiment of a system 110 for ionizing and mass analyzing analytes received within an open end of a sampling OPI, as described in the '667 Application. System 110 includes acoustic droplet injection device 11 configured to inject a droplet 49 from a reservoir into the open end of sampling OPI 51. As shown in FIG. 1B, the exemplary system 110 generally includes a sampling OPI 51 in fluid communication with a nebulizer-assisted ion source 160 for discharging a liquid containing one or more sample analytes (e.g., via electrospray electrode 164) into an ionization chamber 112, and a mass analyzer 170 in fluid communication with the ionization chamber 112 for downstream processing and/or detection of ions generated by the ion source 160. A fluid handling system 140 (e.g., including one or more pumps 143 and one or more conduits) provides for the flow of liquid from a solvent reservoir 150 to the sampling OPI 51 and from the sampling OPI 51 to the ion source 160. For example, as shown in FIG. 1B, the solvent reservoir 150 (e.g., containing a liquid, desorption solvent) can be fluidly coupled to the sampling OPI 51 via a supply conduit through which the liquid can be delivered at a selected volumetric rate by the pump 143 (e.g., a reciprocating pump, a positive displacement pump such as a rotary, gear, plunger, piston, peristaltic, diaphragm pump, or other pump such as a gravity, impulse, pneumatic, electrokinetic, and centrifugal pump), all by way of non-limiting example. As discussed in detail below, the flow of liquid into and out of the sampling OPI 51 occurs within a sample space accessible at the open end such that one or more droplets 49 can be introduced into the liquid boundary 50 at the sample tip and subsequently delivered to the ion source 160.

As shown, the system 110 includes an acoustic droplet injection device 11 that is configured to generate acoustic energy that is applied to a liquid contained within a reservoir (as depicted in FIG. 1A) that causes one or more droplets 49 to be ejected from the reservoir into the open end of the sampling OPI 51. A controller 180 can be operatively coupled to the acoustic droplet injection device 11 and can be configured to operate any aspect of the acoustic droplet injection device 11 (e.g., focusing means, acoustic radiation generator, automation means for positioning one or more reservoirs into alignment with the acoustic radiation generator, etc.) so as to inject droplets into the sampling OPI 51 or otherwise discussed herein substantially continuously or for selected portions of an experimental protocol by way of non-limiting example. Controller 180 can be, but is not limited to, a microcontroller, a computer, a microprocessor, the computer system of FIG. 1, or any device capable of sending and receiving control signals and data.

As shown in FIG. 1B, the exemplary ion source 160 can include a source 65 of pressurized gas (e.g. nitrogen, air, or a noble gas) that supplies a high velocity nebulizing gas flow which surrounds the outlet end of the electrospray electrode 164 and interacts with the fluid discharged therefrom to enhance the formation of the sample plume and the ion release within the plume for sampling by 114*b* and 116*b*, e.g., via the interaction of the high speed nebulizing flow and jet of liquid sample (e.g., analyte-solvent dilution). The nebulizer gas can be supplied at a variety of flow rates, for example, in a range from about 0.1 L/min to about 20 L/min, which can also be controlled under the influence of controller 180 (e.g., via opening and/or closing valve 163).

It will be appreciated that the flow rate of the nebulizer gas can be adjusted (e.g., under the influence of controller 180) such that the flow rate of liquid within the sampling OPI 51 can be adjusted based, for example, on suction/aspiration force generated by the interaction of the nebulizer gas and the analyte-solvent dilution as it is being discharged from the electrospray electrode 164 (e.g., due to the Venturi effect).

As shown in FIG. 1B, the ionization chamber 112 can be maintained at atmospheric pressure, though in some embodiments, the ionization chamber 112 can be evacuated to a pressure lower than atmospheric pressure. The ionization chamber 112, within which the analyte can be ionized as the analyte-solvent dilution is discharged from the electrospray electrode 164, is separated from a gas curtain chamber 114 by a plate 114*a* having a curtain plate aperture 114*b*. As shown, a vacuum chamber 116, which houses the mass analyzer 170, is separated from the curtain chamber 114 by a plate 116*a* having a vacuum chamber sampling orifice 116*b*. The curtain chamber 114 and vacuum chamber 116 can be maintained at a selected pressure(s) (e.g., the same or different sub-atmospheric pressures, a pressure lower than the ionization chamber) by evacuation through one or more vacuum pump ports 118.

It will also be appreciated by a person skilled in the art and in light of the teachings herein that the mass analyzer 170 can have a variety of configurations. Generally, the mass analyzer 170 is configured to process (e.g., filter, sort, dissociate, detect, etc.) sample ions generated by the ion source 160. By way of non-limiting example, the mass analyzer 170 can be a triple quadrupole mass spectrometer, or any other mass analyzer known in the art and modified in accordance with the teachings herein. Other non-limiting, exemplary mass spectrometer systems that can be modified in accordance various aspects of the systems, devices, and methods disclosed herein can be found, for example, in an article entitled "Product ion scanning using a Q-q-Q linear ion trap (Q TRAP) mass spectrometer," authored by James W. Hager and J. C. Yves Le Blanc and published in Rapid Communications in Mass Spectrometry (2003; 17: 1056-1064), and U.S. Pat. No. 7,923,681, entitled "Collision Cell for Mass Spectrometer," which are hereby incorporated by reference in their entireties.

Other configurations, including but not limited to those described herein and others known to those skilled in the art, can also be utilized in conjunction with the systems, devices, and methods disclosed herein. For instance, other suitable mass spectrometers include single quadrupole, triple quadrupole, ToF, trap, and hybrid analyzers. It will further be appreciated that any number of additional elements can be included in the system 110 including, for example, an ion mobility spectrometer (e.g., a differential mobility spectrometer) that is disposed between the ionization chamber 112 and the mass analyzer 170 and is configured to separate ions based on their mobility through a drift gas in high- and low-fields rather than their mass-to-charge ratio). Additionally, it will be appreciated that the mass analyzer 170 can comprise a detector that can detect the ions which pass through the analyzer 170 and can, for example, supply a signal indicative of the number of ions per second that are detected.

Mass Spectrometry Background

Mass spectrometers are often coupled with chromatography or other sample introduction systems, such as an ADE device and OPI, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example. More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the product ion. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the product ion of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, MS/MS$^{ALL}$. In an MS/MS$^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the MS/MS$^{ALL}$ method, all the precursor ions in each precursor ion mass selection window are fragmented, and all of the product ions of all of the precursor ions in each mass selection window are mass analyzed.

SUMMARY

A system, method, and computer program product are disclosed for aligning samples with detected peaks in AEMS. In some embodiments a system may be provided that includes an ADE device, an OPI, an ion source device, a mass spectrometer, and a controller for coordinating action of the components.

The ADE device performs an identifiable sequence of one ore more ejections from one or more samples of a series of samples using a different combination of values or pattern of values for one or more ADE parameters than an analysis sequence of sample ejections for the series of samples being analyzed. The ADE device performs the identifiableidentifiable sequence of one or more ejections to produce one or more mass peaks that have a different feature value or pattern of feature values for one or more peak features than mass peaks produced for an analysis sequence of samples being analyzed. The ADE device also stores or communicates sample ejection times corresponding to the identifiable sequence of ejections. The sample ejection times, and or characteristics of the identifiable sequence of one or more ejections may produce corresponding one or more identifiable mass peaks that may be used to align a subsequent analysis sequence of mass peaks with corresponding ejected samples.

The OPI receives the identifiable sequence of one or more ejections and the other ejections at an inlet of a tube. The OPI mixes received identifiable ejections with a solvent in the tube to form a series of analyte-solvent dilutions. The OPI transfers the series of dilutions to an outlet of the tube.

The ion source device receives the series of dilutions and ionizes the series of dilutions, producing an ion beam. The mass spectrometer receives the ion beam and mass analyzes the ion beam over time, producing a series of detected intensity versus time mass peaks.

The processor receives peaks of the series of peaks and the stored times of sample ejections. The processor identifies one or more detected peaks of the received series of peaks with the different feature value or pattern of feature values as corresponding to or produced by the identifiable ejections. The processor calculates a delay time from the time of the identifiable ejections and the time of the identified one or more detected peaks. Finally, the processor aligns the series of detected peaks with the series of samples using the delay time, the stored times, and the order of series of samples.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Figure 1A:
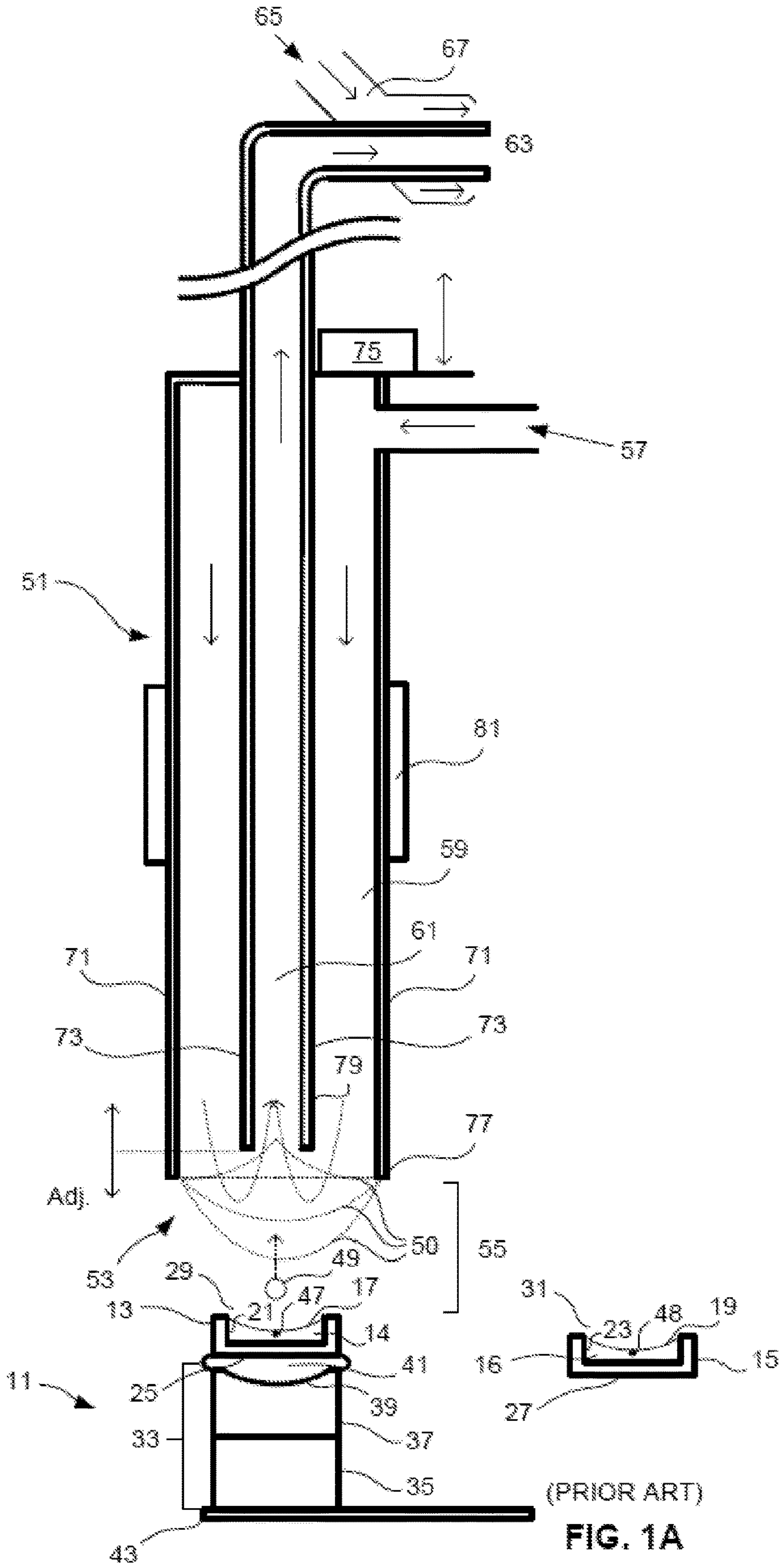
FIG. 1A is an exemplary system combining an acoustic droplet ejection (ADE) with an open port interface (OPI) sampling interface, as described in the '667 Application.
Figure 1B:
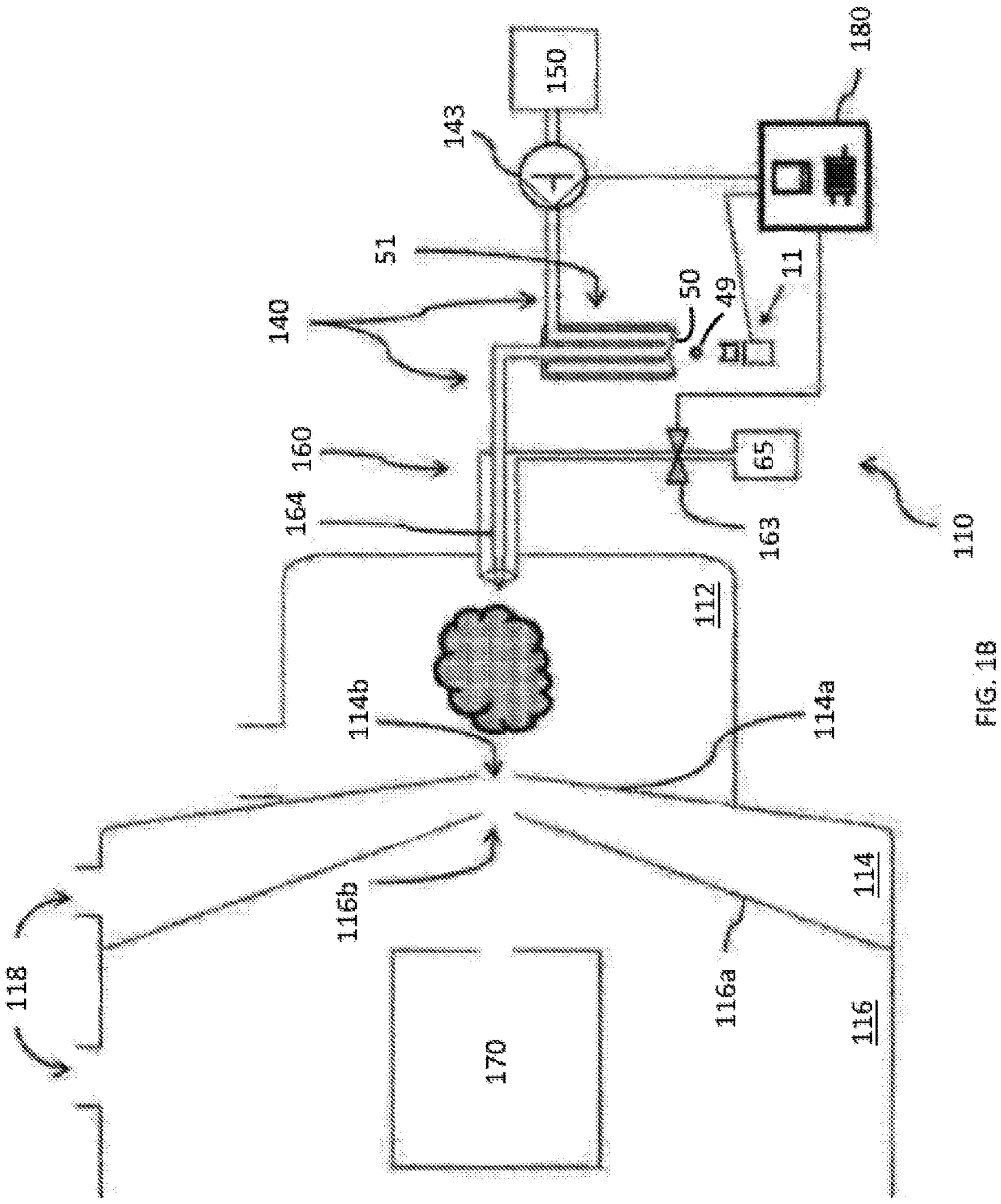
FIG. 1B (PRIOR ART)
FIG. 1B is an exemplary system for ionizing and mass analyzing analytes received within an open end of a sampling OPI, as described in the '667 Application.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 2:
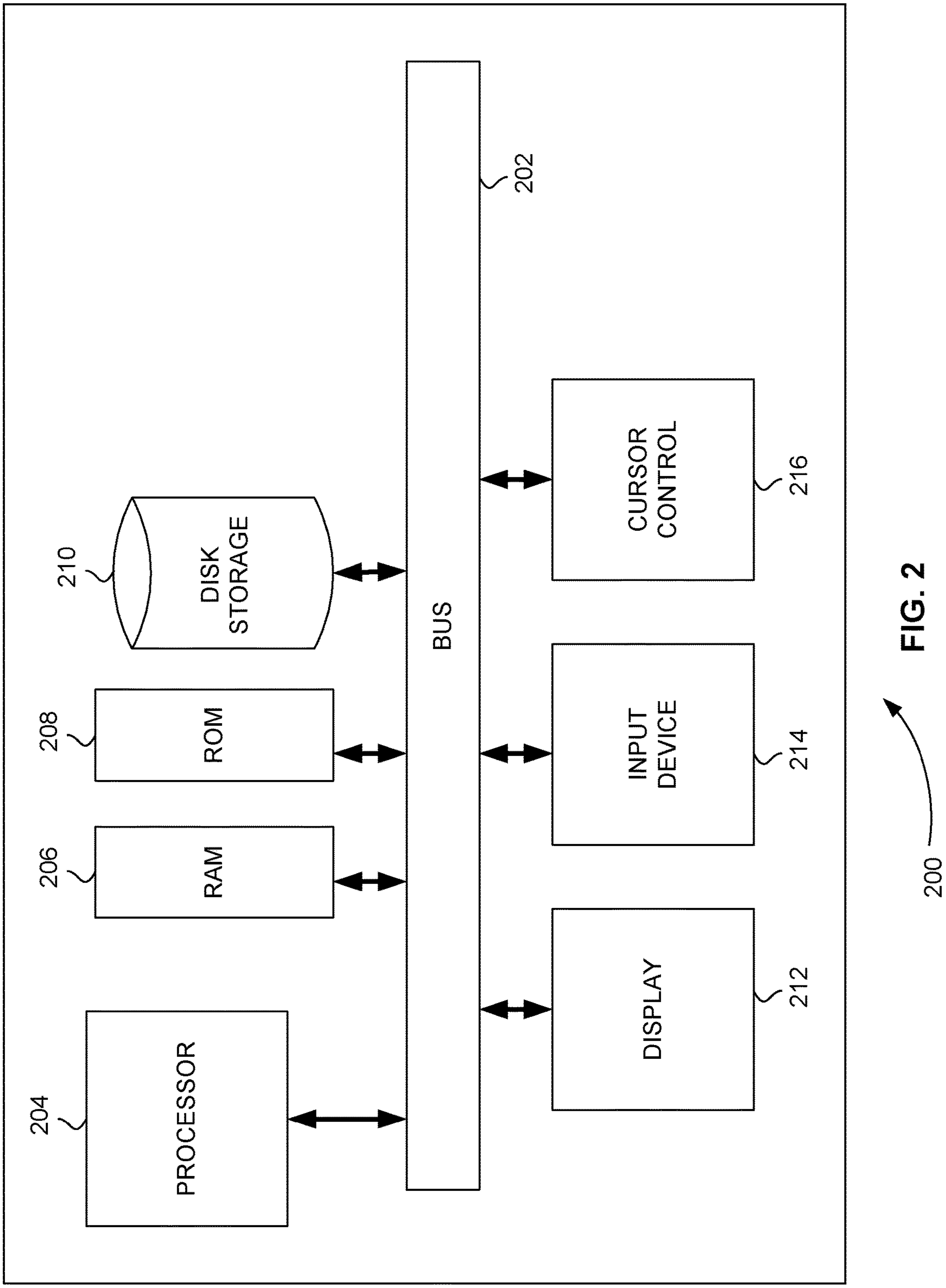
FIG. 2 is a block diagram that illustrates a computer system, upon which embodiments of the present teachings may be implemented.

FIG. 2 is a block diagram that illustrates a computer system 200, upon which embodiments of the present teachings may be implemented. Computer system 200 includes a bus 202 or other communication mechanism for communicating information, and a processor 204 coupled with bus 202 for processing information. Computer system 200 also includes a memory 206, which can be a random-access memory (RAM) or other dynamic storage device, coupled to bus 202 for storing instructions to be executed by processor 204. Memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT) or liquid crystal display (LCD), for displaying information to a computer user. An input device 214, including alphanumeric and other keys, is coupled to bus 202 for communicating information and command selections to processor 204. Another type of user input device is cursor control 216, such as a mouse, a trackball or cursor direction keys for communicating direction information and command selections to processor 204 and for controlling cursor movement on display 212. This input device typically has two degrees of freedom in two axes, a first axis (i.e., x) and a second axis (i.e., y), that allows the device to specify positions in a plane.

A computer system 200 can perform the present teachings Consistent with certain implementations of the present teachings, results are provided by computer system 200 in response to processor 204 executing one or more sequences of one or more instructions contained in memory 206. Such instructions may be read into memory 206 from another computer-readable medium, such as storage device 210. Execution of the sequences of instructions contained in memory 206 causes processor 204 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 200 can be connected to one or more other computer systems, like computer system 200, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as memory 206. Transmission media includes coaxial cables, copper wire, and fiber optics, including the wires that comprise bus 202.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 204 for execution. For example, the instructions may initially be carried on the magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector coupled to bus 202 can receive the data carried in the infra-red signal and place the data on bus 202. Bus 202 carries the data to memory 206, from which processor 204 retrieves and executes the instructions. The instructions received by memory 206 may optionally be stored on storage device 210 either before or after execution by processor 204.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software, but the present teachings may be implemented as a combination of hardware and software or in hardware alone. The present teachings may be implemented with both object-oriented and non-object-oriented programming systems.

Identifiable Acoustic Ejection for Timing Alignment

As described above, currently in AEMS systems, the ADE device includes a timing file that specifies the time each sample of each well is ejected. After MS analysis, the peaks detected over time are aligned with the times of the timing file.

Figure 3:
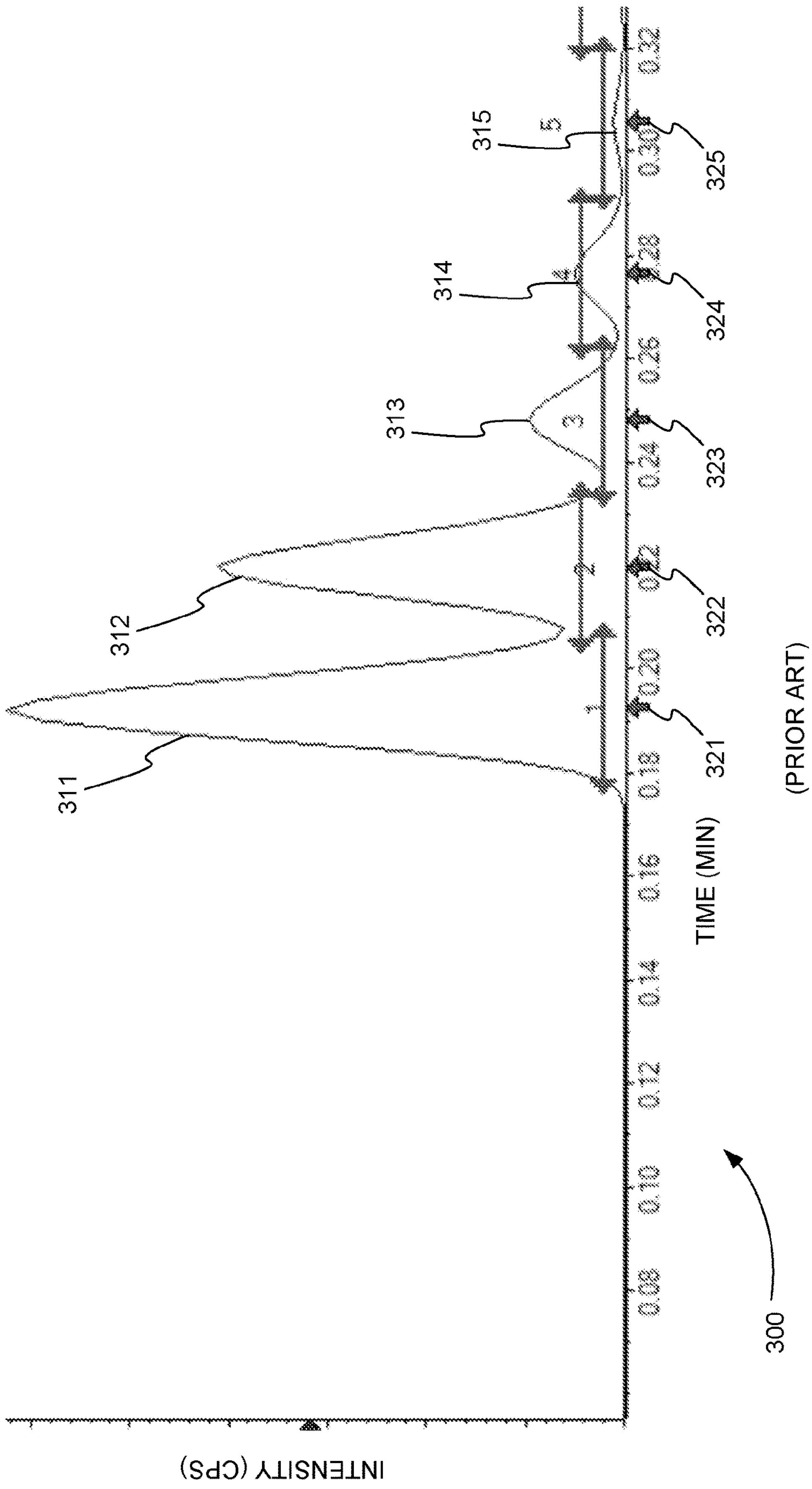
(PRIOR ART) FIG. 3
FIG. 3 is an exemplary plot showing the proper alignment of detected peaks with ejection times from an ADE device timing file.

FIG. 3 is an exemplary plot 300 showing the proper alignment of detected peaks with ejection times from an ADE device timing file. In plot 300, for example, intensity versus time peaks 311, 312, 313, 314, and 315 are properly aligned with ejection times depicted by arrows 321, 322, 323, 324 and 325, respectively.

However, if some peaks, particularly the first one or more peaks, are missing, this alignment may be confounded.

Figure 4:
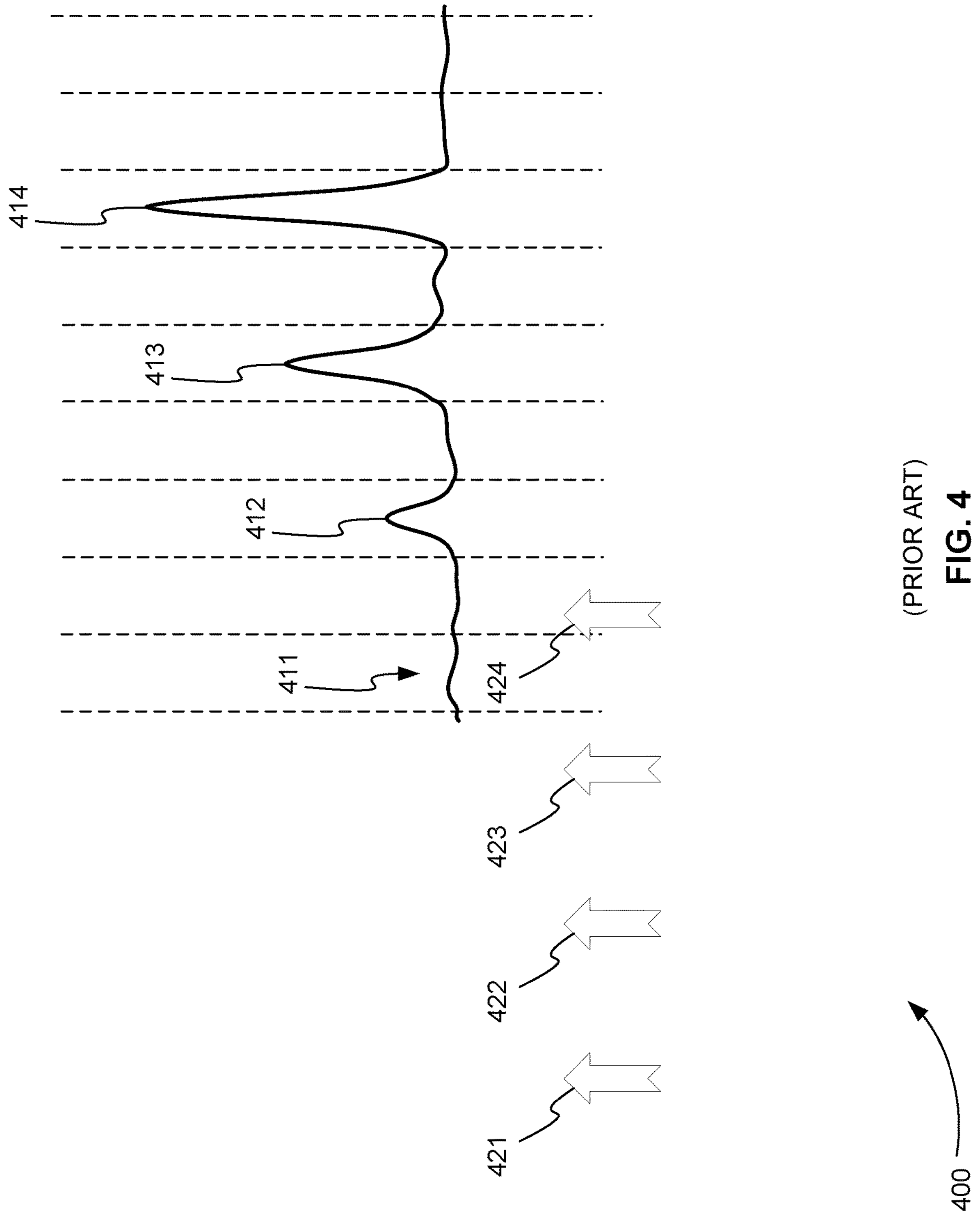
(PRIOR ART) FIG. 4
FIG. 4 is an exemplary plot showing three peaks detected over time by a mass spectrometer for analytes from four different samples sequentially provided to the mass spectrometer by an ADE device and an OPI.

FIG. 4 is an exemplary plot 400 showing three peaks detected over time by a mass spectrometer for analytes from four different samples sequentially provided to the mass spectrometer by an ADE device and an OPI. In plot 400, intensity versus time peaks 412, 413, and 414 are detected by the mass spectrometer for three different samples ejected into the OPI by the ADE device. At time 411, a peak is missing for a fourth sample, which was the first sample that the ADE device attempted to eject into the OPI.

Arrows 421, 422, 423, and 424 show the ejection times of the four different samples relative to time peaks 412, 413, and 414. In other words, the position of arrows 421, 422, 423, and 424 relative to time peaks 412, 413, and 414 shows the time delay between sample ejection by the ADE device and sample analysis by the mass spectrometer. Plot 400 shows that, because of the time delay between sample ejection and analysis, arrows 421, 422, 423, and 424 must be aligned with peaks 412, 413, and 414 in order to determine the sample corresponding to each peak. The ejection times depicted by arrows 421, 422, 423, and 424 are stored in the timing file by the ADE device, for example.

Figure 5:
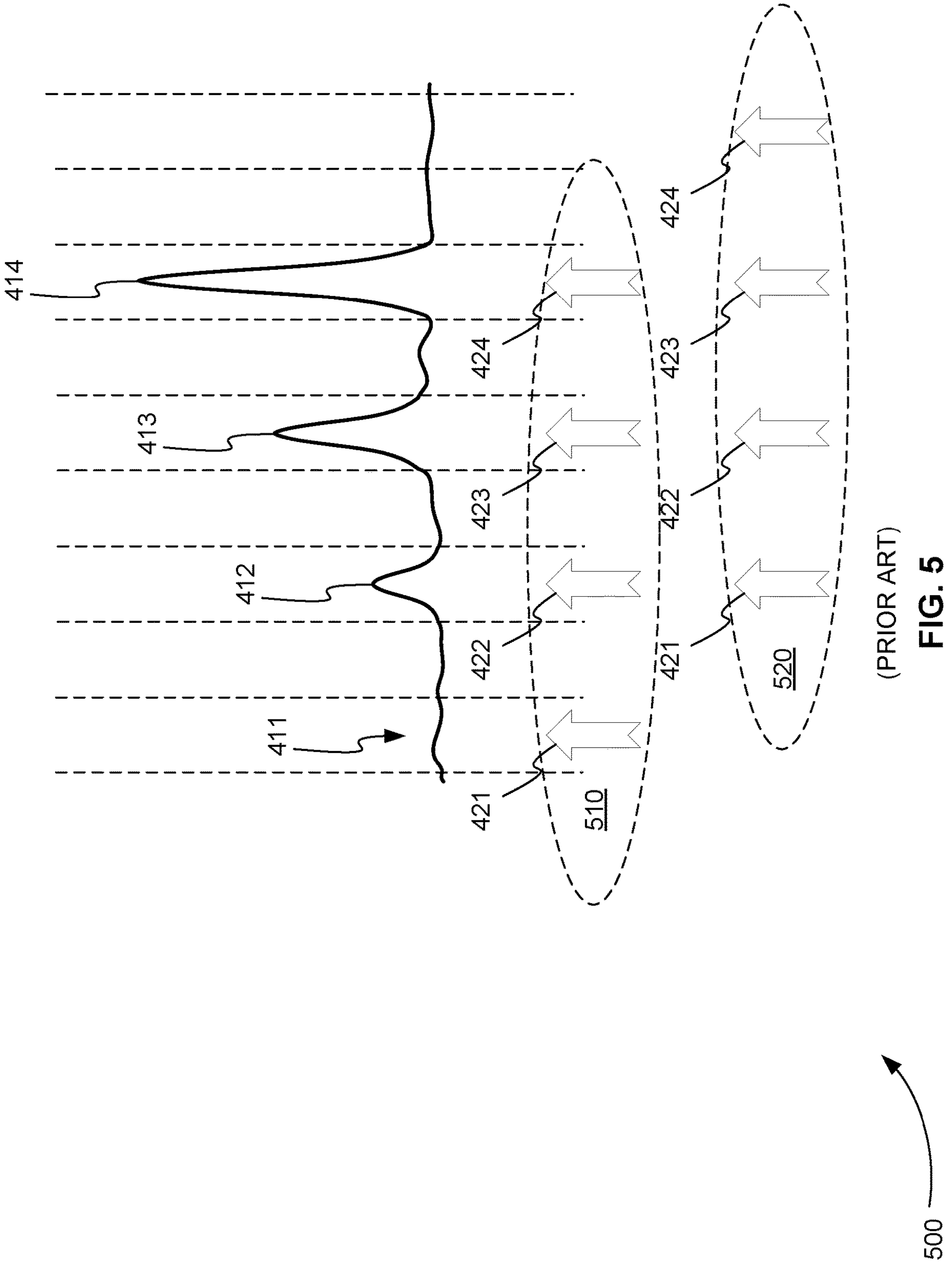
(PRIOR ART) FIG. 5
FIG. 5 is an exemplary plot showing how the mismatch in the number of peaks detected and the number of ejection times in FIG. 4 results in different alignments of the four different sample ejections with the three peaks of FIG. 4.

FIG. 5 is an exemplary plot 500 showing how the mismatch in the number of peaks detected and the number of ejection times in FIG. 4 results in different alignments of the four different sample ejections with the three peaks of FIG. 4. In alignment 510, ejection times depicted by arrows 422, 423, and 424 are aligned with peaks 412, 413, and 414, respectively. In alignment 520, however, ejection times depicted by arrows 421, 422, and 423 are aligned with peaks 412, 413, and 414, respectively. Both alignments are possible.

As a result, plot 500 shows that the determination of the samples corresponding to peaks 412, 413, and 414 is confounded by the missing peak at time 411. In other words, a missing peak at time 411 makes it difficult to determine the identity of peaks 412, 413, and 414, potentially resulting in incorrect results for the four samples and all samples following those four samples.

Figure 6:
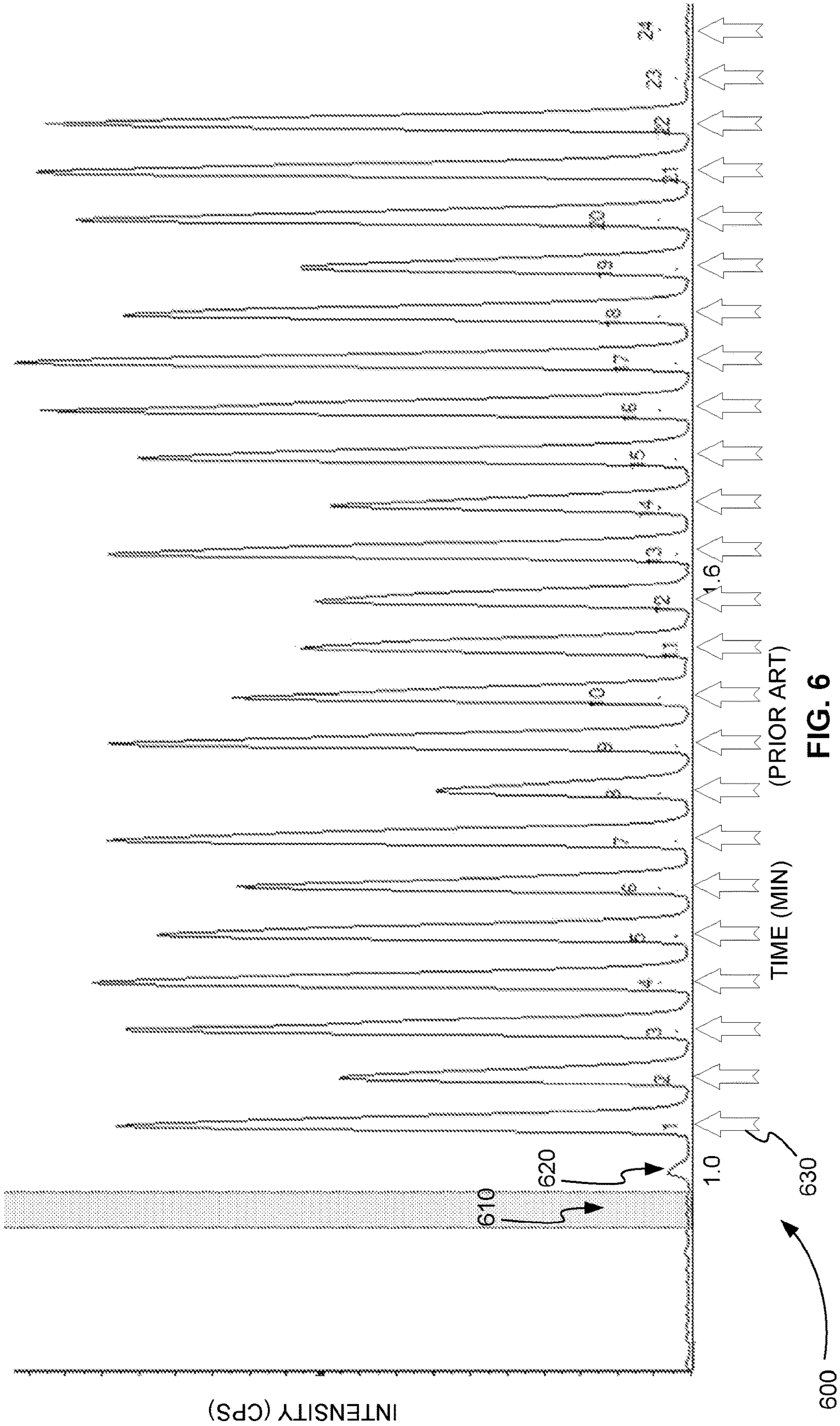
(PRIOR ART) FIG. 6
FIG. 6 is an exemplary plot showing detected peaks misaligned with ejection times due to a missing peak and a low-intensity peak.

FIG. 6 is an exemplary plot 600 showing detected peaks misaligned with ejection times due to a missing peak and a low-intensity peak. In plot 600, there is a missing peak at time 610 and there is a low-intensity peak at time 620 relative to the other peaks detected. As a result, the alignment of the ejection times represented by arrows 630 is off or shifted by two samples or wells. Consequently, the data reported for all 24 wells is incorrect due to the misalignment.

FIGS. 4, 5, and 6 show that additional AEMS systems and methods are needed to align the ejection times of the ADE device with the peaks detected over time by the mass spectrometer in order to ensure that missing peaks do not produce errors in the data collected.

In various embodiments, during an experiment with many sample injections, an ADE device is operated to perform a sequence of one or more identifiable ejections on one or more samples that are identifiable in comparison to ejections performed for all other samples. The identifiable ejections are performed so as to produce one or more peaks detected by a mass spectrometer that are identifiable in comparison to all other peaks that are detected. The sequence on one or more identifiable ejections may be distinguished from a subsequent analysis sequence of ejections based on a number of different characteristics of the ejection performed by the ADE.

By aligning the time of the identifiable ejections of the ADE device with the time of the identifiable one or more peaks of the mass spectrometer, all other ejection times and detected peaks are, in turn, properly aligned. One of ordinary skill in the art can appreciate that using the terms "is operated" or "operating" in relation to a device or structure is equivalent to using the term "is adapted to" or any other terms meant to describe a functional use of a device or structure.

In various embodiments, the identifiable sequence comprises timing information which may be used to correlate the timing of the analysis sequence. In these embodiments, the identifiable ejections can be performed at any time during the sample ejection process. In other words, the identifiable ejections can be performed on one or more samples at the start, in the middle, or at the end of the sample ejection process. If alignment is performed after data acquisition, where the identifiable ejections are performed does not matter. For example, if the identifiable ejections are performed on the last sample, all other samples will be properly aligned if the last sample is aligned.

In various other embodiments, however, the identifiable ejections are performed on the first one or more samples. One of the advantages of performing the identifiable ejections on the first one or more samples is the ability to use the delay information in real-time. For example, if the identifiable ejections are performed on the first one or more samples, the delay time produced by the OPI is known immediately and can be used by the mass spectrometer for the remaining samples.

In various embodiments, the identifiable ejections are performed on the first one or more samples and the delay time found by aligning one or more detected peaks with the identifiable ejections is used by the mass spectrometer to modify, in real-time, a targeted acquisition method for all subsequent samples. As described above, in some targeted acquisition methods, such as scheduled MRM, a retention time or a retention time range is provided for each transition. Only at that retention time or within that retention time range will that particular transition be interrogated. Due to the variability in the delay time of OPI, the retention times or retention time ranges of scheduled MRM transitions, for example, used in AEMS may need to be changed in real-time. By using identifiable ejections for the first one or more samples, the exact delay time can be found. This delay time can then be fed back to the mass spectrometer to be used to correct the retention times or retention ranges of the subsequent scheduled MRM transitions. Accordingly, one or more operational parameters of the mass spectrometer may be adjusted based on information generated from the detected identifiable sequence.

As described above, the identifiable ejections can be created using a different value or pattern of values for one or more ADE parameters compared to other ejections. The one or more ADE parameters can include, but are not limited to, one or more of the ejection time period, the ejection rate, and the droplet volume.

For example and in various embodiments, the simplest identifiable ejections are produced by using a time period of ejections for a single sample that is wider than or narrower than the time period of ejections used for any other sample. In various alternative embodiments, the identifiable ejections can be produced by ejecting the single sample using a identifiable pattern of ejection time periods. In addition, the identifiable pattern of ejection time periods can also be applied across two or more samples. A identifiable pattern of ejection time periods can also include blank space, which is a time period during which no ejections are taking place.

Figure 7:
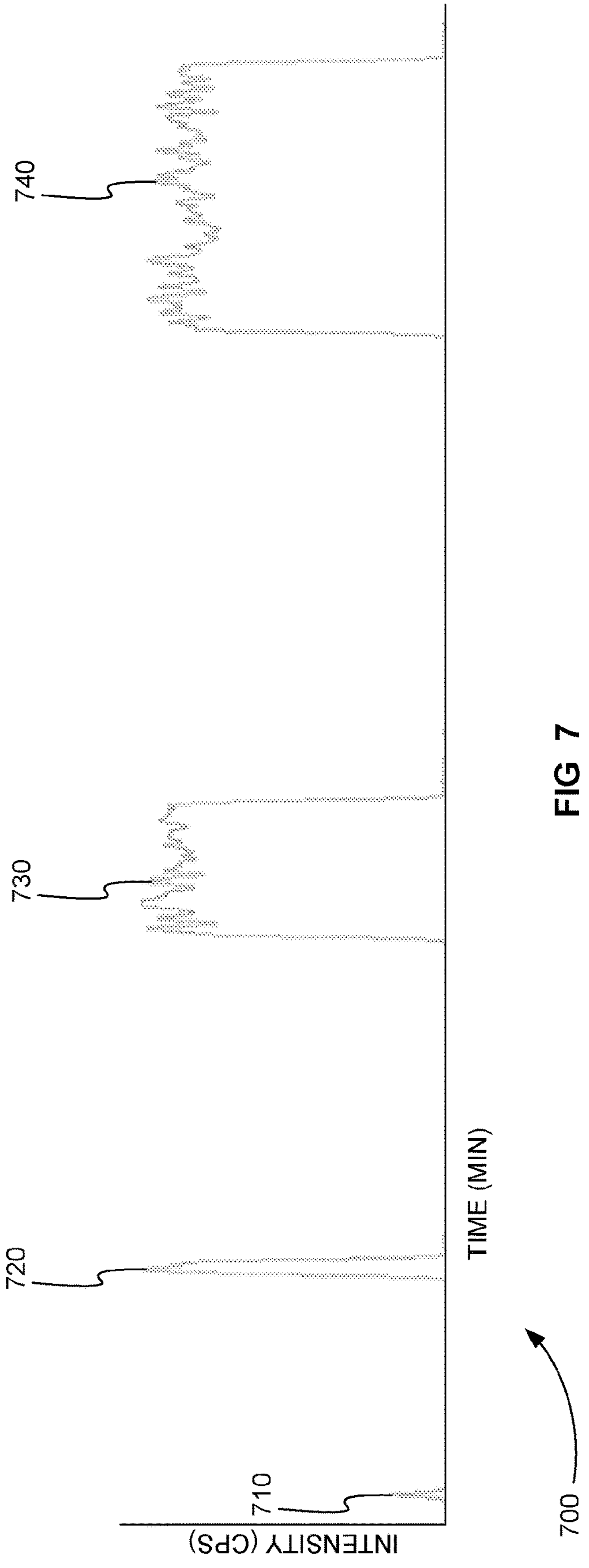
FIG. 7 is an exemplary plot showing how the peaks detected by a mass spectrometer can be varied by changing the ejection time periods of an ADE device, in accordance with various embodiments.

FIG. 7 is an exemplary plot 700 showing how the peaks detected by a mass spectrometer can be varied by changing the ejection time periods of an ADE device, in accordance with various embodiments. In plot 700, peak 710 represents the ejection of a single droplet. Peak 720 represents the ejection of 10 droplets per second for a time period of five seconds. Peak 730 represents the ejection of 10 droplets per second for a time period of 30 seconds. Peak 740 represents the ejection of 10 droplets per second for a time period of one minute.

In plot 700, a identifiable detected peak width is created by varying the time period over which a high enough droplet rate is performed. A high enough droplet rate is one that is faster than the baseline width of a single droplet in order to create a single wider detected peak. In other words, plot 700 shows that the width of a detected peak can be varied by varying the time period of ejections.

A comparison of peaks 710 and 720 also shows that both the peak intensity and peak width can be affected by varying the time period of ejections. For example, a comparison of peaks 710 and 720 shows that increasing the time period of ejections can increase detected peak intensity. A comparison of peaks 710, 720, 730, and 740 shows that increasing the time period of ejections can also increase detected peak width.

In an alternative embodiment, peak intensity and peak width can also be varied by changing the droplet volume. Unfortunately, however, in current systems, the range of volumes over which a droplet can be changed is much more limited than the time period over which droplets can be ejected.

Plot 700 shows that applying identifiable ejections for a sample from a single well can produce a detected peak with a identifiable detected peak. For example, the time period of ejections for peak 730 may be used for one sample and the time period of ejections for peak 720 may be used for all other peaks. In other words, a single identifiable peak or peak width can be used to align ejection timings with detected peaks.

In various alternative embodiments, a identifiable pattern of two or more time periods of ejection is used to produce a identifiable pattern or code of detected peaks. In various embodiments, the identifiable pattern can be produced from a single sample. In various alternative embodiments, the identifiable pattern can be produced from two or more samples.

In various embodiments, the identifiable pattern can be the barcode of one or more sample plates. By imposing a specific bar code signal into the data from a specific sample plate, plate traceability of the data can be enhanced. Such a method can provide enhanced security of the data and also enhanced confidence in the clinical results. Such a scheme is important for, for example, highly regulated markets.

In some embodiments, the identifiable pattern may comprise a unique pattern of identifying information for that ejection sequence. In some embodiments, the identifiable pattern may comprise a repeatable pattern that is distinguishable from the sequence of analysis ejections. In some aspects, the identifiable pattern may be repeated, for instance at the start of each row of a sample well plate, or to frame the beginning and end of an analysis sequence. In some aspects, the identifiable pattern may be repeated one or more times throughout the analysis sequence to ensure timing has been maintained and an expected number of analysis samples have been captured for mass analysis.

In various embodiments, the identifiable pattern can include information. For example, the identifiable pattern can be an encoding of the number of samples to be analyzed from a plate.

Again, the identifiable pattern can be produced for any sample or any group of samples within the total number of samples analyzed. In one embodiment, the identifiable pattern is produced for the first sample or the first two or more samples for the reasons described above and, at least, the following reason.

For example, introducing a identifiable pattern of ejection time periods for the first sample ensures that the detection of this first sample is robust. A identifiable pattern of acoustic sample ejections and space between ejections of a first sample is analogous to a barcode pattern of dark and white bands. Once the first sample is robustly identified from the identifiable pattern, processing of detected peaks from the following samples is easily accomplished by knowing when the acoustic device ejected these samples. If the detection of the first sample (using the barcode pattern) fails, it is immediately known that the plate has a problem and processing the remaining samples can be halted conserving resources and preventing the production of inaccurate information. This barcode pattern can be made identifiable and also robust to a single misfire event.

Figure 8:
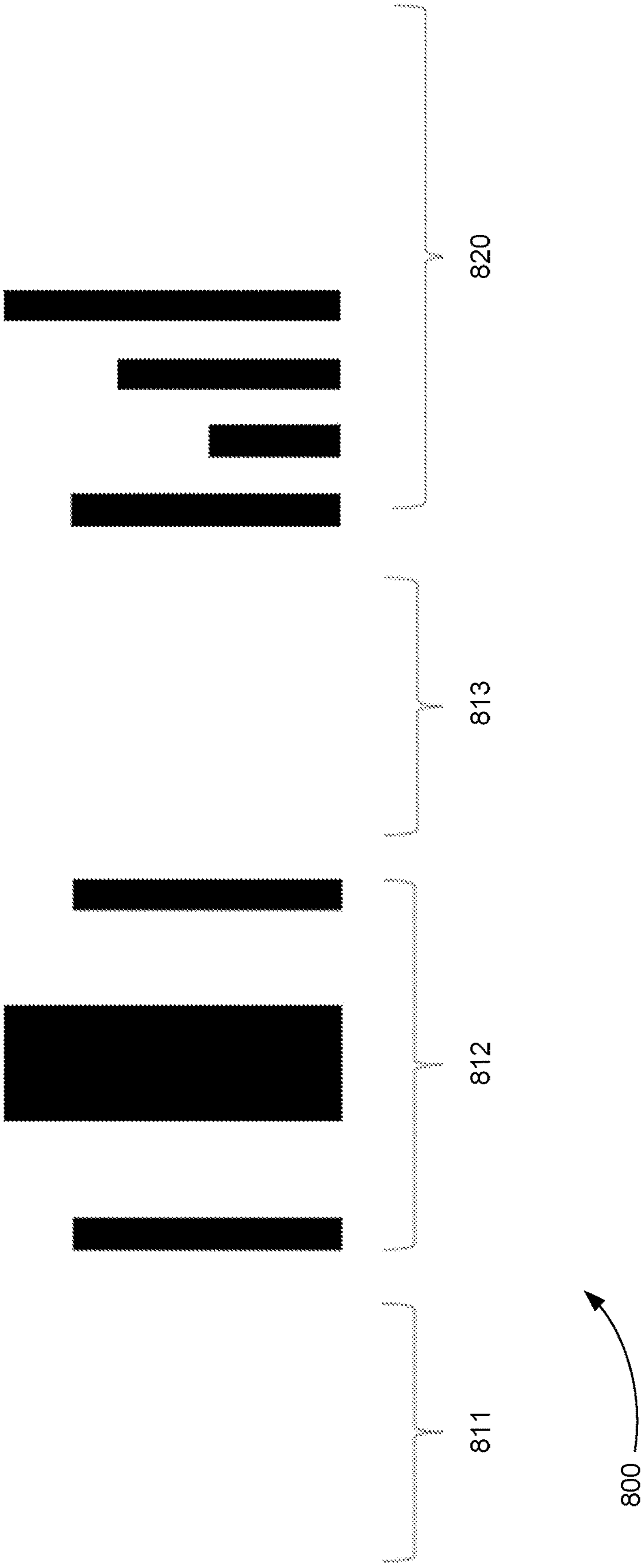
FIG. 8 is an exemplary plot of idealized detected peaks including a first identifiable pattern of peaks and white space followed by remaining sample peaks, in accordance with various embodiments.

FIG. 8 is an exemplary plot 800 of idealized detected peaks including a first identifiable pattern of peaks and white space followed by remaining sample peaks, in accordance with various embodiments. In plot 800, a identifiable pattern or barcode for the first sample includes white space 811 before the first sample, a identifiable detected peak barcode 812 for the first sample, and white space 813 between the first sample and the rest of the samples. Remaining samples 820 do not include the identifiable pattern or barcode of the first sample.

Note that dark space or a peak is created by acoustically ejecting sample. Note again that the width and height of the peak can be varied using acoustic parameters such as the ejection rate, the ejection time period, and the droplet volume. Identifiable white space is created by leaving a longer than normal gap between acoustic ejection events, for example.

In various embodiments, the barcode pattern does not need to interfere with normal data processing. The barcode data can be stored in a raw data file and never shown to the user. The user then only sees the split data or the processed data (table of numbers).

Again, in various embodiments, the barcode pattern can be placed in other locations within the plate read to ensure data alignment. Also, in various embodiments, a identifiable barcode can be used in more than one place. For example, a identifiable barcode can be used on the first well and another identifiable barcode can be used on the last well in the plate sequence as a “bookending” to ensure alignment within the entire plate. In various embodiments, these two identifiable barcodes can be the same barcode.

In various embodiments, the barcode does not have to be applied to the first well analyzed. If users run a standard curve, the well with a high signal is usually run after wells with lower signals. As a result, the barcode can be applied to a well with a good signal. As long as it is known which well is used as the barcode marker well, the samples of the plate can be aligned or it can be determined that the alignment was not successful.

Figure 9:
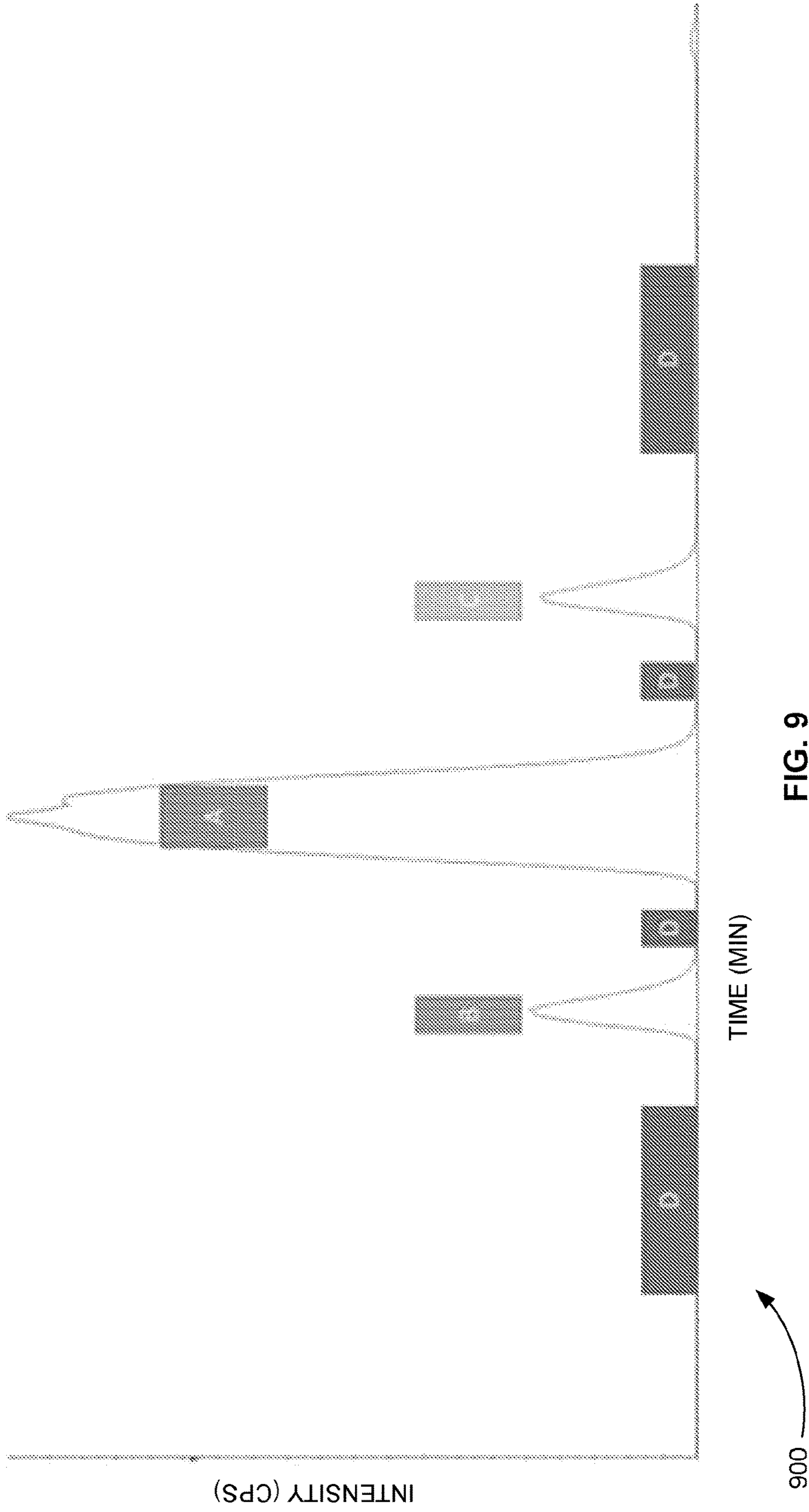
FIG. 9 is an exemplary plot showing a mask for identifying a identifiable pattern or barcode of detected peaks, in accordance with various embodiments.

FIG. 9 is an exemplary plot 900 showing a mask for identifying a identifiable pattern or barcode of detected peaks, in accordance with various embodiments. If the barcode pattern is applied to the first sample, the time range within which the barcode pattern will appear is known. Based on flow rates and expected variability in transfer times, this time range or window is, for example, between two and 12 seconds after the ejection time.

During this time range, a mask is applied to locate the identifiable barcode pattern. The mask includes shaded regions A, B, C, and D. The mask is generated using the same cycle time as the MS data. Note that for time-of-flight (TOF) mass analyzers or scheduled MRM, where the cycle time varies, this technique of using a mask would need to be modified to account for the varying cycle time.

The method begins by moving the mask across every data point detected by the mass spectrometer and calculating the minimum intensity of A and the maximum intensity in each of regions C and D. If the intensity of region A is greater than the intensity of region B, the intensity of region A is greater than the intensity of region C, the intensity of region B is greater than the intensity of region D, and the intensity of region C is greater than the intensity of region D, then a possible barcode pattern has been detected.

If a possible barcode pattern has been detected, the widths of peaks A, B, and C are measured. The width of A must be greater than the width of the B and greater than the width of C. If this condition is satisfied, the barcode pattern is verified.

Note that the use of a mask is just one method of identifying the identifiable pattern. Other methods include, but are not limited, true peak detection with width and height measurements.

In various embodiments, there can be more than one barcode pattern. If two barcode patterns are found, the distance between them is measured. This distance must match the time between barcode ejections recorded in the timing file of the ADE device. In addition, no detected peaks should be found with intensities higher than the lowest intensity of the two barcode patterns either before the first barcode pattern or after the last barcode pattern. If these additional conditions are met for the two barcode patterns, then again the barcode patterns are verified.

Figure 10:
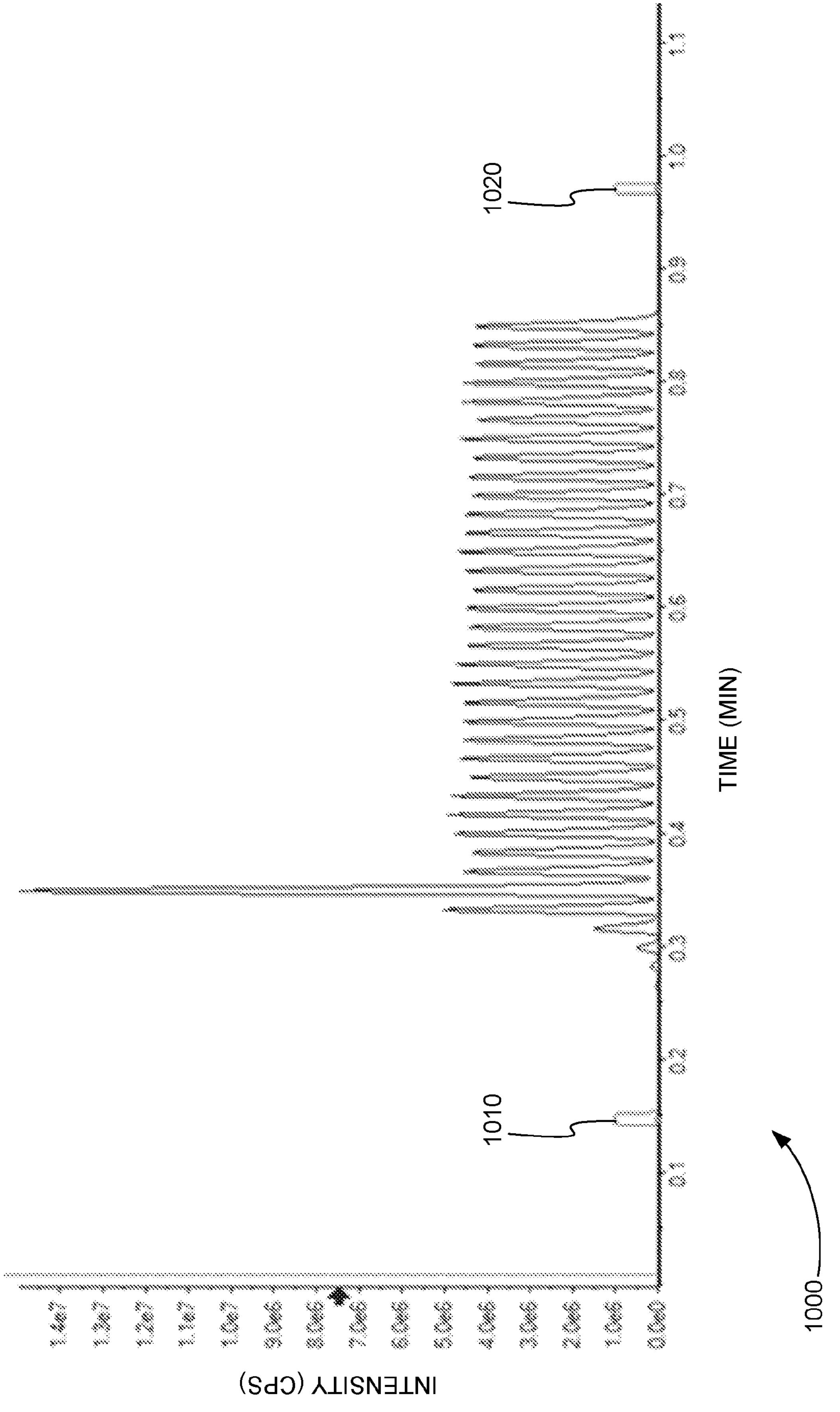
FIG. 10 is an exemplary plot showing the locations of two detected peak barcode patterns for two samples relative to the detected peaks for the remaining samples using the mask of FIG. 9, in accordance with various embodiments.

FIG. 10 is an exemplary plot 1000 showing the locations of two detected peak barcode patterns for two samples relative to the detected peaks for the remaining samples using the mask of FIG. 9, in accordance with various embodiments. In plot 1000, box 1010 marks the location of the first barcode pattern, and box 1020 marks the location of the second barcode pattern. However, because the intensities of the detected peaks of the barcode patterns are much lower than the intensities of the detected peaks of other samples, the two detected barcode patterns cannot be seen in plot 1000.

Figure 11:
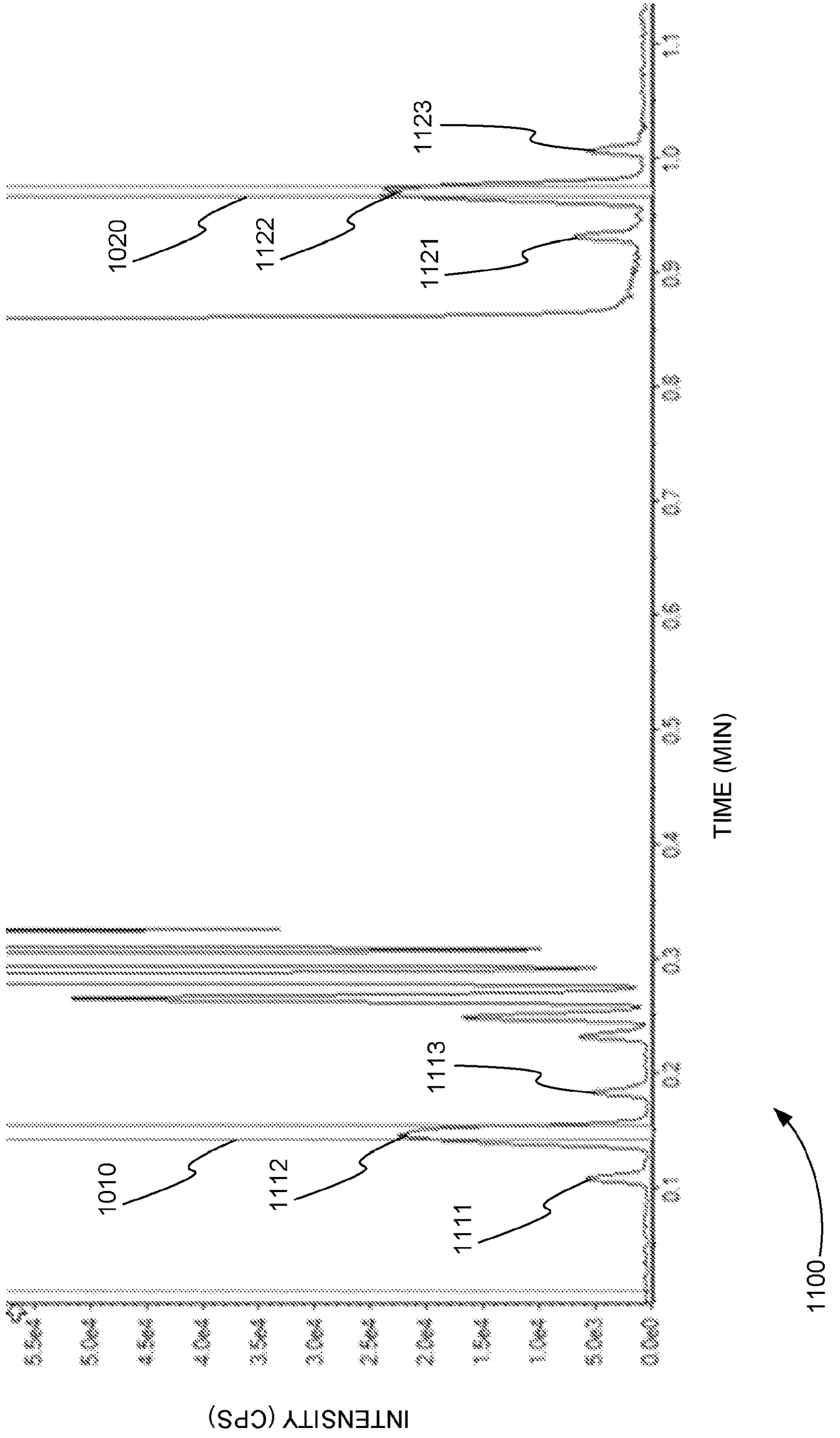
FIG. 11 is an exemplary plot showing the same data as in FIG. 10 but plotted with respect to a lower intensity range in order to see the two barcode patterns of FIG. 10, in accordance with various embodiments.

FIG. 11 is an exemplary plot 1100 showing the same data as in FIG. 10 but plotted with respect to a lower intensity range in order to see the two barcode patterns of FIG. 10, in accordance with various embodiments. In plot 1100, again box 1010 marks the location of the first barcode pattern, and box 1020 marks the location of the second barcode pattern. However, the detected peaks of these barcode patterns are now visible. For example, peaks 1111, 1112, and 1113 provide the dark space of the first barcode pattern, and peaks 1121, 1122, and 1123 provide the dark space of the last barcode pattern. Note that these barcode patterns are the same as those shown in FIGS. 8 and 9.

System for Aligning Samples with Detected Peaks

Figure 12:
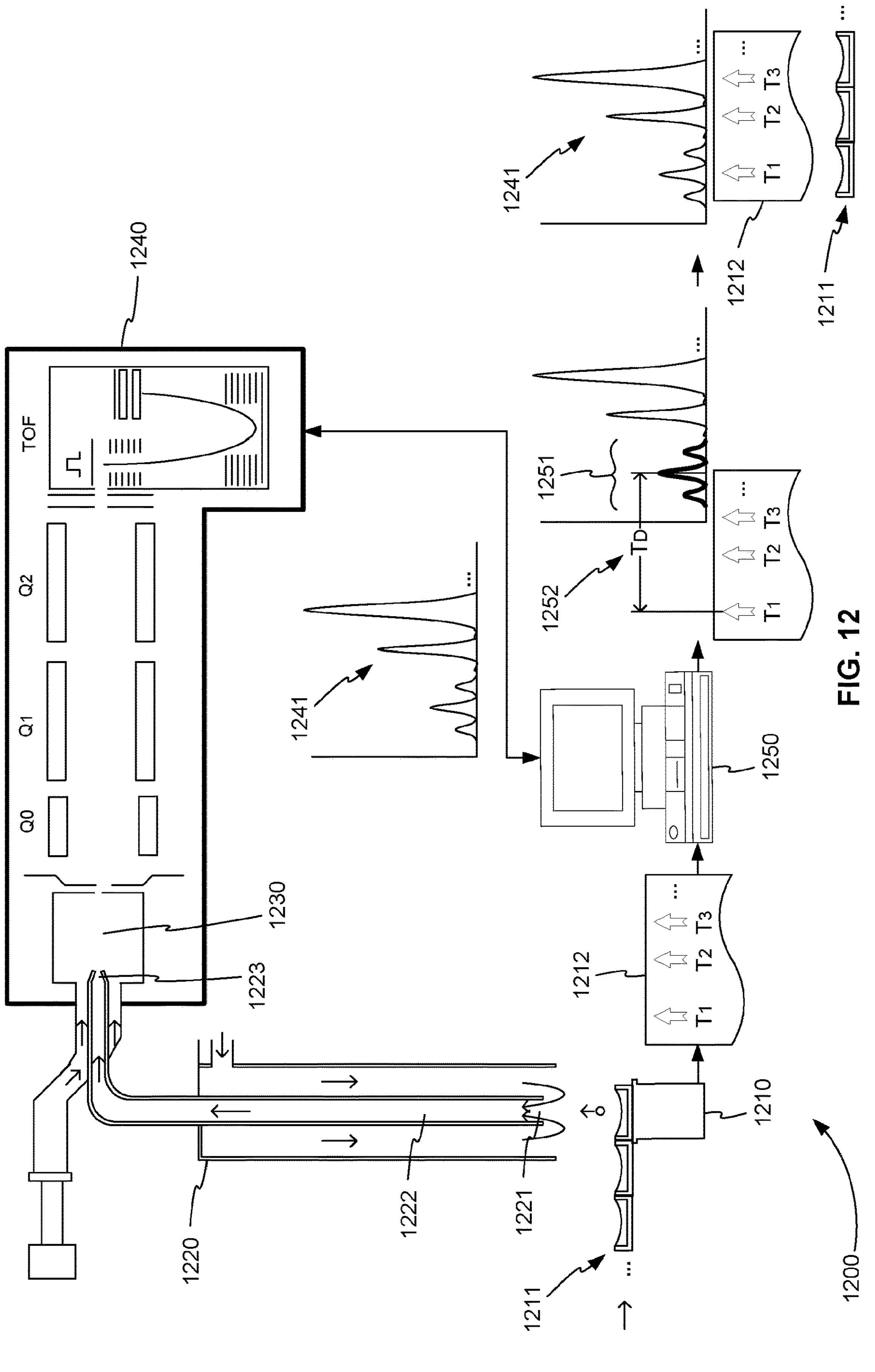
FIG. 12 is a schematic diagram of a system for aligning samples with detected peaks in AEMS, in accordance with various embodiments.

FIG. 12 is a schematic diagram 1200 of a system for aligning samples with detected peaks in AEMS, in accordance with various embodiments. The system of FIG. 12 includes ADE device 1210, OPI 1220, ion source device 1230, mass spectrometer 1240, and processor 1250.

ADE device 1210 performs identifiable ejections for one or more samples of series of samples 1211 using a different value or pattern of values for one or more ADE parameters than other ejections performed for other samples of series of samples 1211. ADE device 1210 performs the identifiable ejections to produce one or more mass peaks that have a different feature value or pattern of feature values for one or more peak features than mass peaks produced for other samples. ADE device 1210 stores sample ejection times 1212. ADE device 1210 can be, for example, ADE device 11 of FIG. 1A.

Returning to FIG. 12, OPI 1220 receives the identifiable ejections and the other ejections at inlet 1221 of tube 1222. OPI 1220 mixes received ejections with a solvent in tube 1222 to form a series of analyte-solvent dilutions. OPI 1220 transfers the series of dilutions to outlet 1223 of tube 1222. OPI 1220 can be, for example, OPI 51 of FIG. 1A.

Returning to FIG. 12, ion source device 1230 receives the series of dilutions and ionizes the series of dilutions, producing an ion beam. Ion source device 1230 can be an electrospray ion source (ESI) device, for example. Ion source device 1230 is shown as part of mass spectrometer 1240 in FIG. 12 but can be a separate device also.

Mass spectrometer 1240 receives the ion beam and mass analyzes the ion beam over time, producing series of detected intensity versus time mass peaks 1241. Mass spectrometer 1240 can perform MS or MS/MS. Mass spectrometer 1240 can be any type of mass spectrometer. Mass spectrometer 1240 is shown as including a time-of-flight (TOF) mass analyzer, but mass spectrometer 1240 can include any type of mass analyzer.

Processor 1250 receives peaks of series of peaks 1241 and the stored times 1212 of sample ejections. Processor 1250 identifies one or more detected peaks of received series of peaks 1241 with the different feature value or pattern of feature values as corresponding to or produced by the identifiable ejections. Processor 1250 calculates delay time 1252 from the time of the identifiable ejections and the time of identified one or more detected peaks 1251. Finally, processor 1250 aligns series of detected peaks 1241 with series of samples 1211 using delay time 1252, stored times 1212, and the order of series of samples 1211.

In various embodiments, processor 1250 calculates delay time 1252 from a difference between the time of the identifiable ejections and the time of the identified one or more detected peaks 1251. In various other embodiments, processor 1250 calculates delay time 1252 by shifting the time of the identifiable ejections until it matches the time of the identified one or more detected peaks 1251.

In various embodiments, the one or more ADE parameters can include one or more of an ejection time period, an ejection rate, and a droplet volume. In other words, ADE device 1210 performs identifiable ejections for one or more samples of series of samples 1211 using a different value or pattern of values for one or more of the ejection time period, the ejection rate, and the droplet volume.

In various embodiments, the one or more peak features can include one or more of a peak width, a peak intensity, and a time distance to an adjacent peak. In other words, ADE device 1210 performs identifiable ejections for one or more samples of series of samples 1211 to produce one or more mass peaks that have a different feature value or pattern of feature values for one or more of a peak width, a peak intensity, and a time distance to an adjacent peak.

In various embodiments, the different pattern of feature values can include a barcode. In other words, the different pattern of feature values of identified one or more detected peaks 1251 in FIG. 12 can be a barcode like the barcode in FIG. 8 that includes white space 811 before the first sample, a identifiable detected peak barcode 812 for the first sample, and white space 813 between the first sample and the rest of the samples.

Returning to FIG. 12, in various embodiments, the barcode can include a barcode of a plate holding series of samples 1211.

In various embodiments, the barcode can include encoded information. For example, the encoded information can include the number or count of the samples in series of samples 1211.

In various embodiments, the one or more samples can include the first one or more samples of series of samples 1211. In other words, ADE device 1210 performs identifiable ejections for the first one or more samples of series of samples 1211.

In various embodiments, the one or more samples can include one or more samples of the series of samples other than the first one or more samples of series of samples 1211. In other words, ADE device 1210 performs identifiable ejections for one or more samples of series of samples 1211 that are not the first one or more samples.

In various embodiments, processor 1250 receives peaks of series of peaks 1241 and the stored times 1212 of sample ejections after acquisition by mass spectrometer 1240 of all peaks. As a result, processor 1250 analyzes series of peaks 1241 in a post-processing step.

In various embodiments, processor 1250 analyzes series of peaks 1241 in real-time as each peak is received. If ADE device 1210 performs identifiable ejections for the first one or more samples of series of samples 1211, processor can calculate delay time 1252 in real-time and provide it as feedback to mass spectrometer 1240. Mass spectrometer 1240 can then use delay time 1252 to correct or improve experimental parameters.

For example, processor 1250 further receives peaks of series of peaks 1241 in real-time as the received peaks are detected by mass spectrometer 1240. Processor 1250 receives stored times 1212 of sample ejections in real-time as sample ejections are performed and ejection times are stored. Processor 1250 identifies one or more detected peaks of the received peaks with the different feature value or pattern of feature values as corresponding to or produced by the identifiable ejections in real-time. Processor 1250 calculates delay time 1252 from a time of the identifiable ejections and a time of identified one or more detected peaks 1251 in real-time. Processor 1250 instructs mass spectrometer 1240 to recalculate values of one or more experimental parameters of the mass analysis using delay time 1252.

In various embodiments, the one or more experimental parameters can include retention time of a scheduled mass analysis (scheduled MRM) or collision energy. For example, delay time 1252 can be used to recalculate retention times of one or more transitions of a scheduled MRM experiment.

In various embodiments, when ADE device 1210 performs identifiable ejections for the first one or more samples of series of samples 1211, it can also perform an additional set of the identifiable ejections for the last one or more samples of series of samples 1211. This provides markers to delimit the beginning and end of series of samples 1211.

For example, ADE device 1210 further performs an additional set of the identifiable ejections for the last one or more samples of series of samples 1211. Processor 1250 then further identifies an additional group of one or more detected peaks with the different feature value or pattern of feature values as corresponding to or produced by the additional set of identifiable ejections. Processor 1250 further identifies the end of series of samples 1211 using the time of the additional group of one or more detected peaks.

In various embodiments, processor 1250 identifies one or more detected peaks of received peaks 1241 with the different pattern of feature values using a mask of the different pattern of feature values. A mask for identifying a identifiable pattern or barcode of detected peaks is shown in FIG. 9, for example.

In various embodiments, processor 1250 is used to send and receive instructions, control signals, and data to and from ADE device 1210, OPI 1220, ion source device 1230, and mass spectrometer 1240. Processor 1250 controls or provides instructions by, for example, controlling one or more voltage, current, or pressure sources (not shown). Processor 1250 can be a separate device as shown in FIG. 12 or can be a processor or controller of ADE device 1210, OPI 1220, ion source device 1230, or mass spectrometer 1240. Processor 1250 can be, but is not limited to, a controller, a computer, a microprocessor, the computer system of FIG. 2, or any device capable of sending and receiving control signals and data and analyzing data.

Method for Aligning Samples with Detected Peaks

Figure 13:
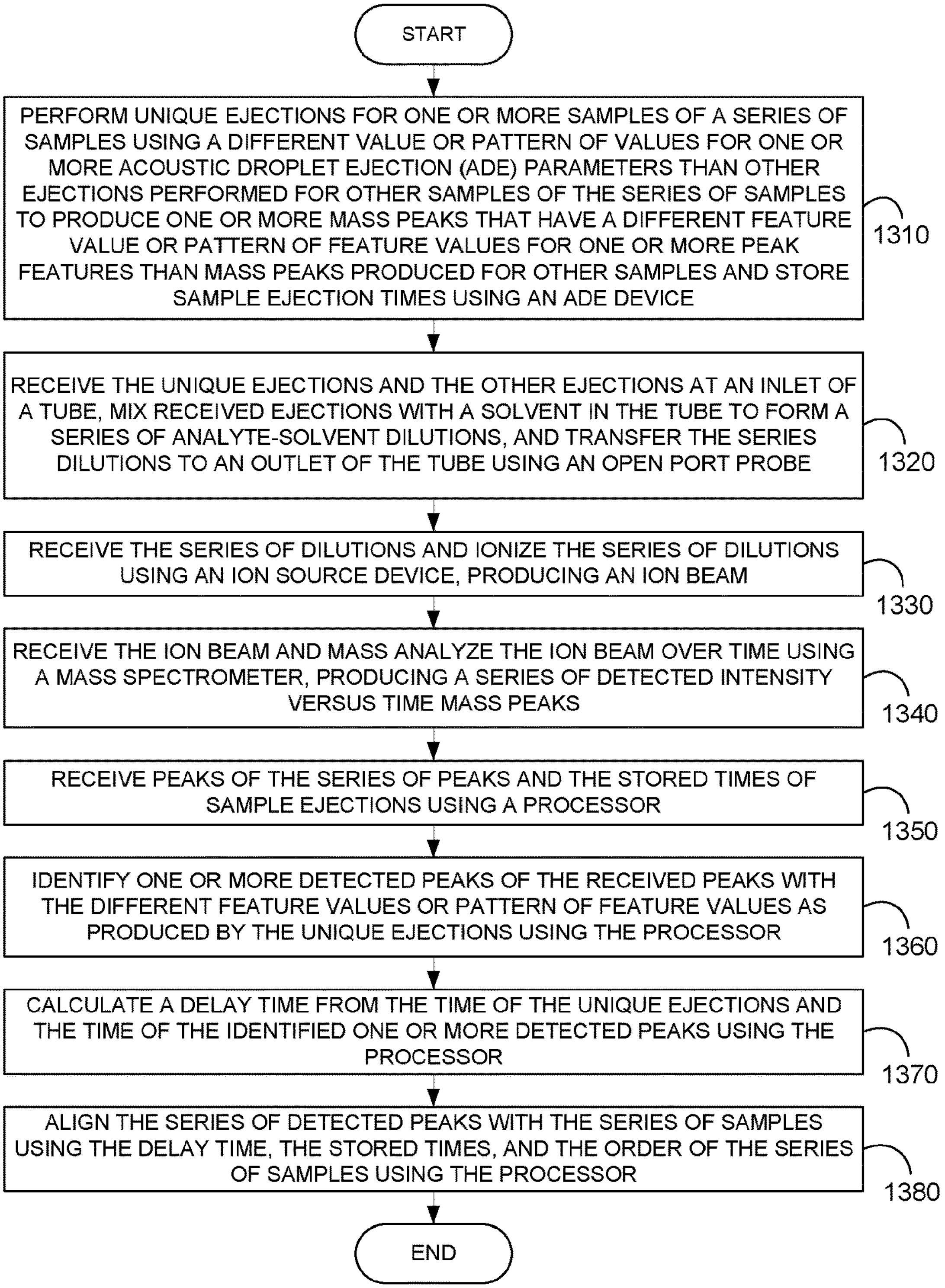
FIG. 13 is a flowchart showing a method for aligning samples with detected peaks in AEMS, in accordance with various embodiments.

FIG. 13 is a flowchart showing a method 1300 for aligning samples with detected peaks in AEMS, in accordance with various embodiments.

In step 1310 of method 1300, identifiable ejections are performed for one or more samples of a series of samples using a different value or pattern of values for one or more ADE parameters than other ejections performed for other samples of the series of samples using an ADE device. The identifiable ejections are performed to produce one or more mass peaks that have a different feature value or pattern of feature values for one or more peak features than mass peaks produced for other samples. Sample ejection times are stored using the ADE device.

In step 1320, the identifiable ejections and the other ejections are received at an inlet of a tube using an OPI. Received ejections are mixed with a solvent in the tube to form a series of analyte-solvent dilutions using the OPI. Finally, the series of dilutions is transferred to an outlet of the tube using the OPI.

In step 1330, the series of dilutions is received and the series of dilutions is ionized using an ion source device, producing an ion beam.

In step 1340, the ion beam is received and the ion beam is mass analyzed over time using a mass spectrometer, producing a series of detected intensity versus time mass peaks.

In step 1350, peaks of the series of peaks and the stored times of sample ejections are received using a processor.

In step 1360, one or more detected peaks of the received peaks with the different feature values or pattern of feature values are identified as produced by the identifiable ejections using the processor.

In step 1370, a delay time is calculated from the time of the identifiable ejections and the time of the identified one or more detected peaks using the processor.

In step 1380, the series of detected peaks is aligned with the series of samples using the delay time, the stored times, and the order of the series of samples using the processor.

Computer Program Product for Aligning Samples with Detected Peaks

In various embodiments, computer program products include a tangible computer-readable storage medium whose contents include a program with instructions being executed on a processor so as to perform a method for aligning samples with detected peaks in AEMS. This method is performed by a system that includes one or more distinct software modules.

Figure 14:
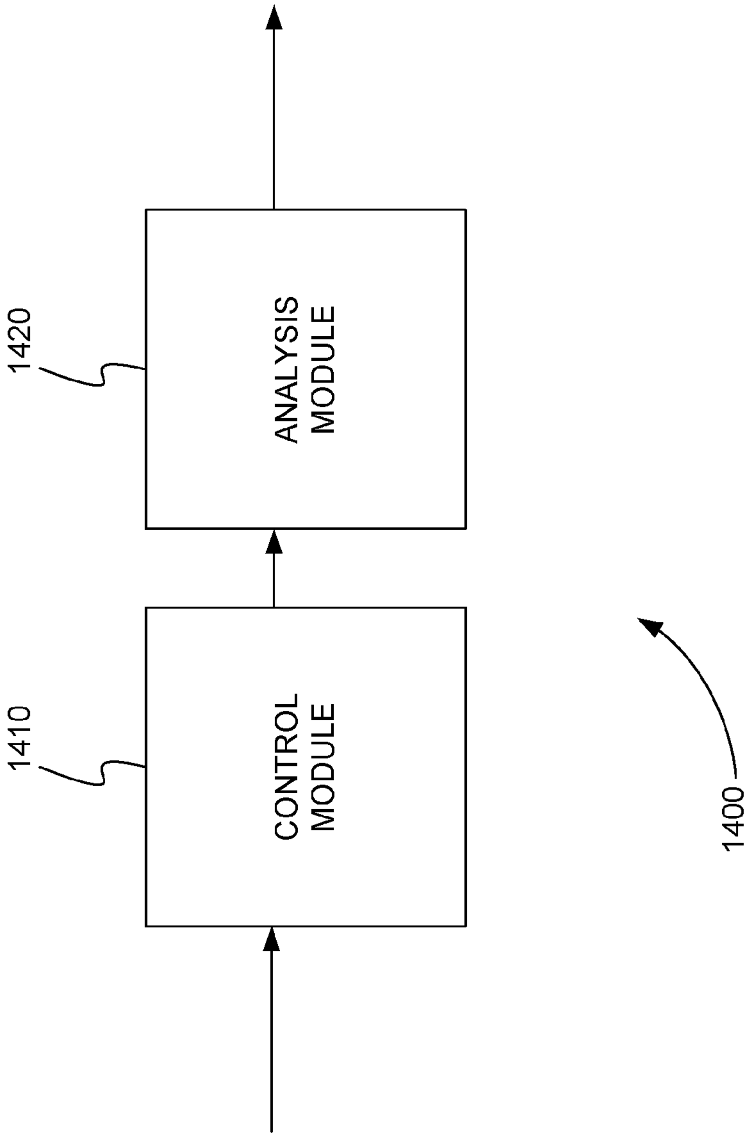
FIG. 14 is a schematic diagram of a system that includes one or more distinct software modules that performs a method for aligning samples with detected peaks in AEMS, in accordance with various embodiments.

FIG. 14 is a schematic diagram of a system 1400 that includes one or more distinct software modules that performs a method for aligning samples with detected peaks in AEMS, in accordance with various embodiments. System 1400 includes control module 1410 and analysis module 1420.

Control module 1410 instructs an ADE device to perform identifiable ejections for one or more samples of a series of samples using a different value or pattern of values for one or more ADE parameters than other ejections performed for other samples of the series of samples. The identifiable ejections are performed to produce one or more mass peaks that have a different feature value or pattern of feature values for one or more peak features than mass peaks produced for other samples. Control module 1410 also instructs the ADE device to store sample ejection times.

Control module 1410 instructs an OPI to receive the identifiable ejections and the other ejections at an inlet of a tube. Control module 1410 instructs the OPI to mix received ejections with a solvent in the tube to form a series of analyte-solvent dilutions. Finally, control module 1410 instructs the OPI to transfer the series of dilutions to an outlet of the tube.

Control module 1410 instructs ion source device to receive the series of dilutions and ionize the series of dilutions, producing an ion beam. Control module 1410 instructs a mass spectrometer to receive the ion beam and mass analyze the ion beam over time, producing a series of detected intensity versus time mass peaks.

Analysis module 1420 receives peaks of the series of peaks and the stored times of sample ejections. Analysis module 1420 identifies one or more detected peaks of the received peaks with the different feature values or pattern of feature values as corresponding to or produced by the identifiable ejections. Analysis module 1420 calculates a delay time from the time of the identifiable ejections and the time of the identified one or more detected peaks. Finally, analysis module 1420 aligns the series of detected peaks with the series of samples using the delay time, the stored times, and the order of the series of samples.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for identifying a first sample in an analysis sequence of one or more analysis samples to be analyzed, comprising:
- an acoustic droplet ejection device (ADE) operative to eject a sample from one or more sample wells;
- an open port interface operative to receive the ejected sample and transport the received sample to a mass analyzer;
- the mass analyzer operative to perform mass analysis on the sample to produce representative mass peaks; and
- a controller, comprising at least a processor, operative to direct the ADE to eject an identifiable sequence of one or more ejections from the sample wells prior to initiating an analysis sequence of ejections for the one or more analysis samples.

2. The system of claim 1, wherein the open port interface is further operative to mix the received sample with solvent and to transport diluted sample to the mass analyzer.

3. The system of claim 1, wherein the identifiable sequence of one or more ejections is generated by varying one or more ADE parameters of the ADE.

4. The system of claim 1, wherein the identifiable sequence is distinguishable from subsequent ejections of the analysis sequence.

5. The system of claim 1, wherein the identifiable sequence further comprises timing information to indicate a start time of the analysis sequence.

6. The system of claim 1, wherein the mass analyzer is operative to produce a series of detected intensity versus time mass peaks and wherein the controller is further operative to:

receive a series of peaks corresponding to the identifiable sequence and the analysis sequence;

identify one or more detected peaks of the received peaks as corresponding to the identifiable sequence;

generate timing information from the one or more detected peaks to indicate a start time of the analysis sequence; and align an analysis series of peaks with the analysis sequence of samples using the start time.

7. The system of claim 1, wherein the one or more ADE parameters comprise one or more of an ejection time period, an ejection rate, and a droplet volume.

8. The system of claim 1, wherein the identifiable sequence is identifiable based on one or more peak features.

9. The system of claim 8, wherein the peak features comprise one or more of a peak width, a peak intensity, and a time distance to an adjacent peak.

10. The system of claim 1, wherein the identifiable sequence is identifiable based on a different pattern of feature values.

11. The system of claim 10, wherein the different pattern comprises a barcode.

12. The system of claim 11, wherein the barcode comprises a barcode of a plate holding the series of samples.

13. The system of claim 11, wherein the barcode comprises encoded information.

14. The system of claim 13, wherein the encoded information comprises a count of samples in the analysis sequence.

15. The system of claim 1, wherein the controller further receives peaks of the series of peaks in real-time as the received peaks are detected by the mass spectrometer and receives times of sample ejections from the ADE as sample ejections are performed, identifies the identifiable sequence in real-time, calculates a delay time from a time of the identifiable sequence and a time of the analysis sequence, and instructs the mass analyzer to conduct mass analysis on the analysis sequence based on the calculated delay time.

16. The system of claim 15, wherein the instruction comprises recalculating values of one or more experimental parameters of the mass analysis based on the delay time.

17. The system of claim 16, wherein the one or more experimental parameters comprise a retention time or collision energy.

18. A system for aligning samples with detected peaks in acoustic ejection mass spectrometry (AEMS), comprising:

an acoustic droplet ejection (ADE) device that performs identifiable ejections for one or more samples of a series of samples using a different value or pattern of values for one or more ADE parameters than other ejections performed for other samples of the series of samples to produce one or more mass peaks that have a different feature value or pattern of feature values for one or more peak features than mass peaks produced for other samples and stores sample ejection times;

an open port interface that receives the identifiable ejections and the other ejections at an inlet of a tube, mixes received ejections with a solvent in the tube to form a series of analyte-solvent dilutions, and transfers the series of dilutions to an outlet of the tube;

an ion source device that receives the series of dilutions and ionizes the series of dilutions, producing an ion beam;

a mass spectrometer that receives the ion beam and mass analyzes the ion beam over time, producing a series of detected intensity versus time mass peaks; and a processor that:

receives peaks of the series of peaks and the stored times of sample ejections, identifies one or more detected peaks of the received peaks with the different feature value or pattern of feature values as produced by the identifiable ejections, calculates a delay time from a time of the identifiable ejections and a time of the identified one or more detected peaks, and aligns the series of detected peaks with the series of samples using the delay time, the stored times, and an order of the series of samples.

19. The system of claim 18, wherein the one or more ADE parameters comprise one or more of an ejection time period, an ejection rate, and a droplet volume.

20. A method for aligning samples with detected peaks in acoustic ejection mass spectrometry (AEMS), comprising:

performing identifiable ejections for one or more samples of a series of samples using a different value or pattern of values for one or more acoustic droplet ejection (ADE) parameters than other ejections performed for other samples of the series of samples to produce one or more mass peaks that have a different feature value or pattern of feature values for one or more peak features than mass peaks produced for other samples and storing sample ejection times using an ADE device;

receiving the identifiable ejections and the other ejections at an inlet of a tube, mixing received ejections with a solvent in the tube to form a series of analyte-solvent dilutions, and transferring the series of dilutions to an outlet of the tube using an open port interface;

receiving the series of dilutions and ionizing the series of dilutions using an ion source device, producing an ion beam;

receiving the ion beam and mass analyzing the ion beam over time using a mass spectrometer, producing a series of detected intensity versus time mass peaks; receiving peaks of the series of peaks and the stored times of sample ejections using a processor;

identifying one or more detected peaks of the received peaks with the different feature values or pattern of feature values as produced by the identifiable ejections using the processor;

calculating a delay time from a time of the identifiable ejections and a time of the identified one or more detected peaks using the processor; and aligning the series of detected peaks with the series of samples using the delay time, the stored times, and an order of the series of samples using the processor.

* * * * *